US010437342B2

(12) United States Patent
Brunner

(10) Patent No.: US 10,437,342 B2
(45) Date of Patent: Oct. 8, 2019

(54) CALIBRATION SYSTEMS AND METHODS FOR DEPTH-BASED INTERFACES WITH DISPARATE FIELDS OF VIEW

(71) Applicant: YouSpace, Inc., Mountain View, CA (US)

(72) Inventor: Ralph Brunner, Cupertino, CA (US)

(73) Assignee: YouSpace, Inc., Santa Clara, CA (US)

(*) Notice: Subject to any disclaimer, the term of this patent is extended or adjusted under 35 U.S.C. 154(b) by 67 days.

(21) Appl. No.: 15/369,799

(22) Filed: Dec. 5, 2016

(65) Prior Publication Data
US 2018/0157328 A1 Jun. 7, 2018

(51) Int. Cl.
*G06F 3/01* (2006.01)
*G06F 3/03* (2006.01)
*G06T 7/80* (2017.01)
*G06T 7/50* (2017.01)

(52) U.S. Cl.
CPC .......... *G06F 3/017* (2013.01); *G06F 3/0304* (2013.01); *G06T 7/50* (2017.01); *G06T 7/80* (2017.01); *G06F 2203/0382* (2013.01); *G06T 2207/10028* (2013.01); *G06T 2207/20* (2013.01)

(58) Field of Classification Search
None
See application file for complete search history.

(56) References Cited

U.S. PATENT DOCUMENTS

| | | | |
|---|---|---|---|
| 3,992,629 A | 11/1976 | Chapman | |
| 4,408,678 A | 10/1983 | White, Jr. | |
| 5,534,917 A | 7/1996 | MacDougall | |
| 6,109,460 A | 8/2000 | Herlevi et al. | |
| 6,130,663 A | 10/2000 | Null | |
| 6,353,428 B1 | 3/2002 | Maggioni et al. | |
| 6,518,565 B1 | 2/2003 | Wu et al. | |
| 7,058,204 B2 | 6/2006 | Hildreth et al. | |
| 7,227,526 B2 | 6/2007 | Hildreth et al. | |
| 7,340,077 B2 | 3/2008 | Gokturk et al. | |

(Continued)

FOREIGN PATENT DOCUMENTS

| DE | 102013211335 | 12/2014 |
|---|---|---|
| KR | 20160116903 | 10/2016 |

(Continued)

OTHER PUBLICATIONS

Youspace, Inc., Tech Field Trip Presentation. Jun. 13, 2017; 18 Pages.

(Continued)

*Primary Examiner* — Brian M Butcher

(57) ABSTRACT

Various of the disclosed embodiments provide Human Computer Interfaces (HCI) that incorporate depth sensors at multiple positions and orientations. The depth sensors may be used in conjunction with a display screen to permit users to interact dynamically with the system, e.g., via gestures. Calibration methods for orienting depth values between sensors are also presented. The calibration methods may generate both rotation and translation transformations that can be used to determine the location of a depth value acquired in one sensor from the perspective of another sensor. The calibration process may itself include visual feedback to direct a user assisting with the calibration. In some embodiments, floor estimation techniques may be used alone or in conjunction with the calibration process to facilitate data processing and gesture identification.

20 Claims, 26 Drawing Sheets

(56) References Cited

U.S. PATENT DOCUMENTS

| | | |
|---|---|---|
| 7,379,563 B2 | 5/2008 | Shamaie |
| 7,379,566 B2 | 5/2008 | Hildreth |
| 7,948,481 B2 | 5/2011 | Vilcovsky |
| 8,553,939 B2 | 10/2013 | Craig et al. |
| 8,610,665 B2 | 12/2013 | Craig et al. |
| 8,788,973 B2 | 7/2014 | Lavigne et al. |
| 8,830,302 B2 | 9/2014 | Im et al. |
| 8,842,906 B2 | 11/2014 | Watson et al. |
| D727,995 S | 4/2015 | Vilcovsky |
| 9,075,441 B2 | 7/2015 | St Hilaire et al. |
| 9,081,419 B2 | 7/2015 | Tocino Diaz et al. |
| 9,164,589 B2 | 10/2015 | Tong et al. |
| 9,292,767 B2 | 3/2016 | Oberg et al. |
| 9,298,346 B2 | 3/2016 | Le Clerc et al. |
| D753,754 S | 4/2016 | Vilcovsky |
| 9,317,112 B2 | 4/2016 | Cao et al. |
| 9,323,338 B2 | 4/2016 | He et al. |
| 9,383,895 B1 | 7/2016 | Vinayakk et al. |
| 9,389,779 B2 | 7/2016 | Anderson et al. |
| 9,424,490 B2 | 8/2016 | Muff et al. |
| 9,429,833 B1 | 8/2016 | Satoh et al. |
| 9,438,891 B2 | 9/2016 | Mannion et al. |
| 9,448,636 B2 | 9/2016 | Balzacki |
| 9,459,758 B2 | 10/2016 | Berenson et al. |
| 9,684,928 B2 | 6/2017 | Freeman et al. |
| 2008/0151092 A1 | 6/2008 | Vilcovsky |
| 2010/0146455 A1 | 6/2010 | Wilson et al. |
| 2010/0199228 A1 | 8/2010 | Latta et al. |
| 2011/0090147 A1 | 4/2011 | Gervais et al. |
| 2011/0122048 A1 | 5/2011 | Choi et al. |
| 2011/0199294 A1 | 8/2011 | Vilcovsky |
| 2011/0288964 A1 | 11/2011 | Linder et al. |
| 2012/0157207 A1 | 6/2012 | Craig et al. |
| 2012/0314031 A1 | 12/2012 | Shotton et al. |
| 2013/0179162 A1 | 7/2013 | Merschon et al. |
| 2013/0241833 A1 | 9/2013 | Craig et al. |
| 2013/0251192 A1 | 9/2013 | Tu et al. |
| 2013/0278499 A1 | 10/2013 | Anderson |
| 2013/0278501 A1 | 10/2013 | Bulzacki |
| 2013/0336524 A1 | 12/2013 | Zhang et al. |
| 2014/0043435 A1 | 2/2014 | Blayvas |
| 2014/0043232 A1 | 3/2014 | Kurokawa |
| 2014/0225977 A1 | 8/2014 | Vilcovsky et al. |
| 2014/0226000 A1 | 8/2014 | Vilcovsky et al. |
| 2014/0226900 A1 | 8/2014 | Saban et al. |
| 2014/0241570 A1 | 8/2014 | Onen et al. |
| 2015/0091790 A1 | 4/2015 | Forutanpour et al. |
| 2015/0109202 A1 | 4/2015 | Ataee et al. |
| 2015/0145860 A1 | 5/2015 | Craig et al. |
| 2015/0199816 A1 | 7/2015 | Freeman et al. |
| 2015/0261184 A1 | 9/2015 | Mannion et al. |
| 2015/0277700 A1 | 10/2015 | He |
| 2016/0048726 A1 | 2/2016 | Tang et al. |
| 2016/0127710 A1 | 5/2016 | Saban et al. |
| 2016/0209655 A1 | 7/2016 | Riccomini et al. |
| 2016/0260260 A1 | 9/2016 | Fei et al. |
| 2016/0288330 A1 | 10/2016 | Konolige |
| 2016/0289042 A1 | 10/2016 | Fang et al. |
| 2016/0292521 A1 | 10/2016 | Fang et al. |
| 2016/0328604 A1 | 11/2016 | Bulzacki |
| 2017/0160751 A1 | 6/2017 | Pierce et al. |
| 2017/0161555 A1 | 6/2017 | Kumar et al. |
| 2017/0161591 A1 | 6/2017 | English et al. |
| 2017/0161592 A1 | 6/2017 | Su et al. |
| 2017/0161607 A1 | 6/2017 | English et al. |
| 2017/0161911 A1 | 6/2017 | Kumar et al. |
| 2018/0150713 A1 | 5/2018 | Farooqi et al. |
| 2018/0181362 A1 | 6/2018 | Kaneko |
| 2018/0300591 A1 | 10/2018 | Brunner et al. |

FOREIGN PATENT DOCUMENTS

| | | |
|---|---|---|
| WO | WO2017095948 | 6/2014 |
| WO | WO2015195652 | 12/2015 |
| WO | WO2014100250 | 6/2017 |

OTHER PUBLICATIONS

Oak Labs, Inc., The Oak Interactive Fitting Room—Vimeo, Published Oct. 8, 2015. Available at https://vimeo.com/141758597. (Retrieved Sep. 4, 2017).

Memomi Labs Inc, Live with Channel 9 Australia—Vimeo, Published May 28, 2015. Available at https://vimeo.com/129075274. (Retrieved Sep. 4, 2017).

Memomi Labs Inc, MemoMi @ CNBC Jun. 2015—Vimeo, Published Jun. 11, 2015, Available at https://vimeo.com/130502071. (Retrieved Sep. 4, 2017).

Memomi Labs Inc. MemoMi Eyewear on Channel 10 Australia—Vimeo, Published Jul. 24, 2016. Available at https://vimeo.com/176075233. (Retrieved Sep. 4, 2017).

Memomi Labs Inc, MemoMi @ Intel CEO Keynote—Vimeo, Published Aug. 19, 2015. Available at https://vimeo.com/136731687. (Retrieved Sep. 4, 2017).

Memomi Labs Inc, MemoMi NRF 2014 @ Intel Channel—Vimeo, Published Feb. 3, 2014. Available at https://vimeo.com/85788520. (Retrieved Sep. 4, 2017).

David Rose, MemoMi—Vimeo, Publised Sep. 23, 2012. Available at https://vimeo.com/50027314. (Retrieved Sep. 4, 2017).

Memomi Labs Inc, MemoMi @ WSJ—Vimeo, Published May 11, 2015. Available at https://vimeo.com/127500728. (Retrieved Sep. 4, 2017).

Memomi Labs Inc, Memory Makeover™ Mirror—Vimeo, Published Dec. 6, 2016. Available at https://vimeo.com/194614701. (Retrieved Sep. 4, 2017).

Memomi Labs Inc, Sunglass Memory Mirror®—Vimeo, Published Jul. 28, 2016. Available at https://vimeo.com/176675288. (Retrieved Sep. 4, 2017).

Memomi Labs Inc, Transparent Mirror—MemoMi x Corning—Vimeo, Published Apr. 7, 2016. Available at https://vimeo.com/161959806. (Retrieved Sep. 4, 2017).

Memomi Labs Inc, Turning colors . . . —Vimeo, Published Jan. 5, 2015. Available at https://vimeo.com/115948779. (Retrieved Sep. 4, 2017).

Memomi Labs Inc, Inventions—Vimeo, Published Nov. 8, 2016. Available at https://vimeo.com/190673032. (Retrieved Sep. 4, 2017).

Elizabeth Segran, Fast Company—Clothes Shopping Sucks. Reformation's High-Tech Store Reimagines It From the Ground Up, Available at https://www.fastcompany.com/3067979/. Published Feb. 13, 2017. (Retrieved Sep. 4, 2017).

Info, A Simple Game, Available at https://www.youtube.com/watch?v=C8-oqlEmMAU. Published Mar. 13, 2013. (Retrieved Sep. 8, 2017).

Admo, Website, Available at: http://admoexperience.github.io/index.html?wvideo=3kzosozp1p; http://admoexperience.github.io/source.html; http://admoexperience.github.io/tech.html. Retrieved Sep. 8, 2017.

Info, Apple App—Youtube, Published Feb. 3, 2014. Available at: https://www.youtube.com/watch?v=nL5GEhCpl24. (Retrieved Sep. 8, 2017).

Info, Flight Centre App, Published Feb. 4, 2014. Available at https://www.youtube.com/watch?v=S63JbIHbB0s. (Retrieved Sep. 8, 2017).

Info, Flying around Google Earth with Admo, Published Sep. 17, 2013. Available at https://www.youtube.com/watch?v=MBZIsfZ4HU4. (Retrieved Sep. 8, 2017).

Info, Friday Showcase—Build Your Own Deal, Published Sep. 30, 2013. Available at https://www.youtube.com/watch?v=z-tuDMKtuPg. (Retrieved Sep. 8, 2017).

Info, HP Store—Case study, Published Sep. 20, 2013. Available at https://www.youtube.com/watch?v=r4jkc7KcyY8. (Retrieved Sep. 8, 2017).

Info, HP Store Walkthrough, Published Sep. 13, 2013. Available at https://www.youtube.com/watch?v=h_ANfHpEXiw. (Retrieved Sep. 8, 2017).

Info, Admo Info Youtube Channel, Published Feb. 21, 2013. Available at https://www.youtube.com/channel/UCMosVez9g2xMJP3ZB3mpErw. (Retrieved Sep. 8, 2017).

(56) References Cited

OTHER PUBLICATIONS

Info, Admo in Action (Google, Flight Centre and HP Store), Published Sep. 19, 2013. Available at https://www.youtube.com/watch?v=4mTruwUjcK4&feature=youtu.be. (Retrieved Sep. 8, 2017).
Info, Mobile App, Published Feb. 3, 2014. Available at https://www.youtube.com/watch?v=5juFiQTbU-A. (Retrieved Sep. 8, 2017).
Info, Music Moods Experience (screencapture), Published May 6, 2013. Available at https://www.youtube.com/watch?v=r4AFLU_XVHo. (Retrieved Sep. 8, 2017).
Info, Real Estate App, Published Feb. 3, 2014. Available at https://www.youtube.com/watch?v=8SvTIIWHCx0. (Retrieved Sep. 8, 2017).
Info, Trace the shapes game, Published Sep. 17, 2013. Available at https://www.youtube.com/watch?v=aeaaCQIODYk. (Retrieved Sep. 8, 2017).
Aimirrorbcn, aiMirror at Bloomberg, Published Jul. 26, 2012. Available at https://www.youtube.com/watch?v=VoPdNMJ3FLQ. (Retrieved Sep. 6, 2017).
Aimirrorbcn, aiMirror: The Smart Shopping experience, Published Jul. 26, 2012. Available at https://www.youtube.com/watch?v=_pwFZEG2hj8. (Retrieved Sep. 6, 2017).
Ádám Horváth, Fitnect—Interactive Virtual Fitting . . . , Published Aug. 8, 2011. Available at https://www.youtube.com/watch?v=1jbvnk1T4vQ. (Retrieved Oct. 4, 2017).
Ádám Horváth, Fitnect—CIB, Published Nov. 25, 2015. Available at https://www.youtube.com/watch?v=k06gvSzrsdw. (Retrieved Sep. 10, 2017).
FXGear, FXMirror_3D Virtual Fitting Solution, Published Feb. 3, 2015. Available at https://www.youtube.com/watch?v=nWcGhuX6N7w. (Retrieved Sep. 10, 2017).
ARDOORMoscow, Kinect Fitting Room for Topshop, Published May 10, 2011. Available at https://www.youtube.com/watch?v=L_cYKFdP1_0. (Retrieved Sep. 10, 2017).
IMGSRCinc, Puma Store Harajuku Interactive Mirror®, Published Mar. 3, 2011. Available at https://www.youtube.com/watch?v=_X2-_t5f_IA. (Retrieved Sep. 10, 2017).
SenseMi—Sense Mirror, SenseMi Virtual Dressing Room, Published May 4, 2017. Available at https://www.youtube.com/watch?v=0Nh6eEjBal8. (Retrieved Sep. 10, 2017).
Unreal Engine 4—Augmented Reality Virtual Mirror Test, Published Mar. 17, 2016. Available https://www.youtube.com/watch?v=z-T_emXRZ5iA&feature=youtu.be. Retrieved (Oct. 1, 2017).
UNREAL4MIRROR website, available at http://unreal4mirror.com/. Retrieved (Sep. 10, 2017).
End Point Liquid Galaxy, Youtube Video Webpage, Published Jul. 30, 2013. Available at https://www.youtube.com/channel/UCf6FHharf_oTy3jW8YmdbdA. (Retrieved Sep. 8, 2017).
Engadget, Skydiving across seven instances of Chrome | Google I/O 2013—YouTube, Published May 15, 2013. Available at https://www.youtube.com/watch?v=wL7JgwemvOQ. (Retrieved Sep. 8, 2017).
Talkandroid, Hands on with Map Diving at Google I/O—YouTube, Published May 15, 2013. Available at https://www.youtube.com/watch?v=uHGXb7-4wqU. (Retrieved Sep. 8, 2017).
End Point Liquid Galaxy, Leap Motion and Liquid Galaxy, Published Oct. 9, 2013. Available at https://www.youtube.com/watch?v=WAvfPkWtPV0. (Retrieved Sep. 8, 2017).
End Point Liquid Galaxy, Liquid Galaxy for Science Centers, Published Nov. 1, 2016. Available at https://www.youtube.com/watch?v=Lcgu1XIMj-8. (Retrieved Sep. 8, 2017).
End Point Liquid Galaxy, Liquid Galaxy on SciTech Now, Published Jun. 23, 2016. Available at https://www.youtube.com/watch?v=aZxWTgR8w3U. (Retrieved Sep. 8, 2017).
Eyesight, About—eye-sight—website, Available at http://www.eyesight-tech.com/about/. (Retrieved Sep. 6, 2017).
Eyesight, Automotive—eye-sight—website, Available at http://www.eyesight-tech.com/product/automotive/. (Retrieved Sep. 6, 2017).
Eyesight, eye-sight—website, Available at http://www.eyesight-tech.com/. (Retrieved Sep. 6, 2017).
Eyesight, IOT & Smart Home—eye-sight—website, Available at http://www.eyesight-tech.com/product/iot-smart-home/. (Retrieved Sep. 6, 2017).
Eyesight, VR & AR—eye-sight—website, Available at http://www.eyesight-tech.com/product/vr-ar/. (Retrieved Sep. 6, 2017).
Flutter, Taps, drags, and other gestures in Flutter—Flutter—website, Available at https://flutter.io/gestures/. (Retrieved Sep. 8, 2017).
Gestigon GMBH, Carnival SDK for Android—YouTube, Published Jul. 12, 2016. Available at https://www.youtube.com/watch?v=6McyTb8QQII. (Retrieved Sep. 7, 2017).
Gestigon GMBH, Carnival—YouTube, Published Nov. 18, 2015. Available at https://www.youtube.com/watch?v=BgjFYR4xI7g&feature=youtu.be . (Retrieved Sep. 6, 2017).
Gestigon GMBH, CES 2017 Driver Monitoring Demo—YouTube, Published Jan. 31, 2017. Available at https://www.youtube.com/watch?v=gx8y1LftdAU. (Retrieved Sep. 7, 2017).
Gestigon GMBH, Flamenco—gestigon's gesture control service for win7 and win8—YouTube, Published Jul. 21, 2014. Available at https://www.youtube.com/watch?v=stCWbKtT4Vo&feature=youtu.be. (Retrieved Sep. 6, 2017).
Gestigon GMBH, gestigonGoesCES2015—Invitation Video—YouTube, Published Dec. 8, 2014. Available at https://www.youtube.com/watch?v=VhHrWYyGzos. (Retrieved Sep. 7, 2017).
Gestigon GMBH, gestigon Carnival AR/VR Interaction Suite with Melexis 175°—YouTube, Published Oct. 13, 2015. Available at https://www.youtube.com/watch?v=vBSJfhZTFF0. (Retrieved Sep. 7, 2017).
Gestigon GMBH, Oyster Advanced Body Skeleton Tracking—YouTube, Published Jun. 6, 2016. Available at https://www.youtube.com/watch?v=UiEq64H07Gk&feature=youtu.be. (Retrieved Sep. 6, 2017).
Gesturetek Health, Cancer Smash on Vimeo, Published Dec. 20, 2016. Available at https://vimeo.com/196479220. (Retrieved Sep. 8, 2017).
Gesturetek Health, Cube at Shriners Children's Hospital on Vimeoo, Published Jun. 7, 2016. https://vimeo.com/169762973. (Retrieved Sep. 8, 2017).
Gesturetek Health, GestureTek Health Creates Interactive Road Safety Learning Experience for VTS Medical on Vimeo, Published Jun. 3, 2016. https://vimeo.com/169300431. (Retrieved Sep. 8, 2017).
Gesturetek Health, GestureTek Health Demo on Vimeo, Published Feb. 1, 2017. https://vimeo.com/202066360. (Retrieved Sep. 8, 2017).
Gesturetek Health, GestureTek Health Sensory CUBE on Vimeo. Published Feb. 16, 2017. Available at https://vimeo.com/204390914. (Retrieved Sep. 8, 2017).
Gesturetek Health, Immersive Therapy Suite—Demo on Vimeo. Published Jun. 7, 2016. Available at https://vimeo.com/169760032. (Acquired Sep. 8, 2017).
Gesturetek Health, IREX—Clinician Edition on Vimeo. Published Jun. 7, 2016. Available at https://vimeo.com/169750941. (Acquired Sep. 8, 2017).
Gesturetek Health, IREX—Soccer with Tracking Overlay on Vimeo. Published Jun. 8, 2016. Available at https://vimeo.com/169857821. (Acquired Sep. 8, 2017).
Gesturetek Health, IREX Teaser on Vimeo. Published May 15, 2017. Available at https://vimeo.com/217517124. (Acquired Sep. 8, 2017).
Gesturetek Health, Multitouch Wall—Kaiser Permanente on Vimeo. Published Jun. 7, 2016. Available at https://vimeo.com/169763297. (Acquired Sep. 8, 2017).
Gesturetek Health, St. Joseph's Health Centre—Just for Kids Clinic on Vimeo. Published Jun. 10, 2016. Available at https://vimeo.com/170179285. (Acquired Sep. 8, 2017).
Gesturetek Health, Virtual Healing on the Doctors on Vimeo. Published Jun. 7, 2016. Available at https://vimeo.com/169727480. (Acquired Sep. 8, 2017).
Gesturetek Health, Virtual Therapy—CBC News on Vimeo. Published Jun. 9, 2016. Available at https://vimeo.com/170041354. (Acquired Sep. 8, 2017).
Heptasense, Hand tracking + gesture recognition using a webcam [old demo]—YouTube. Published Nov. 15, 2016. Available at

(56) References Cited

OTHER PUBLICATIONS https://www.youtube.com/watch?time_continue=26&v=fW-WTinfMVgw. (Acquired Sep. 8, 2017).
Heptasense, Universal motion and gesture controller for VR (smartphone)—YouTube. Published Nov. 12, 2016. Available at https://www.youtube.com/watch?time_continue=5&v=1C5OQV4G-us. (Acquired Sep. 8, 2017).
Liater, liateR at China Hi Tech Fair—YouTube. Published Dec. 20, 2016. Available at https://www.youtube.com/watch?v=et68tGIPj7k. (Acquired Sep. 6, 2017).
Liater, liateR | Interactive Retail shopping. Available at http://liater.co/. (Retrieved Sep. 6, 2017).
Liater, The future of shopping—liateR—YouTube. Published Nov. 7, 2014. Available at https://www.youtube.com/watch?v=6ZCdsTs0uNs. (Acquired Sep. 6, 2017).
LM3LABS, 3DFeel iPortrait on Vimeo. Published Jul. 22, 2014. Available at https://vimeo.com/101382464. (Acquired Sep. 6, 2017).
LM3LABS, AirStrike, the iron man experience on Vimeo. Published Oct. 18, 2010. Available at https://vimeo.com/15946888. (Acquired Sep. 6, 2017).
LM3LABS, Catchyoo Sunameri on Vimeo. Published Sep. 20, 2014. Available at https://vimeo.com/106663669. (Acquired Sep. 6, 2017).
LM3LABS, Interactive wood on Vimeo. Published Jan. 13, 2012. Available at https://vimeo.com/34996253. (Retrieved Sep. 6, 2017).
LM3LABS, iTable32 picture selection on Vimeo. Published Apr. 26, 2012. Available at https://vimeo.com/41122756. (Retrieved Sep. 6, 2017).
LM3LABS, Moovaction multitouch finger tracking software | LM3LABS—website. Available at https://www.lm3labs.com/technologies-2/moovaction/. (Retrieved Sep. 6, 2017).
LM3LABS, multitouch interactive table | LM3LABS—website. Available at https://www.lm3labs.com/technologies-2/itable-32/. (Retrieved Sep. 6, 2017).
LM3LABS, The Samurai Avatar on Vimeo. Published Jul. 22, 2011. Available at https://vimeo.com/26754982. (Acquired Sep. 6, 2017).
LM3LABS, touchless overlay for large surface display | LM3LABS—website. Available at https://www.lm3labs.com/technologies-2/ubiqwindow/. (Retrieved Sep. 6, 2017).
Xloudia—website. Available at https://www.xloudia.com/. (Retrieved Sep. 6, 2017).
Macron, Gesture Call Tutorial—YouTube. Published Oct. 7, 2014. Available at https://www.youtube.com/watch?v=BN3HH9F-gs8&feature=youtu.be. (Acquired Sep. 8, 2017).
Macron, Macron's Gesture-Based Solution—Solutions Smart Display—website. Available at http://www.macrongesture.com/solution_02.html. (Retrieved Sep. 8, 2017).
Macron, Macron's Gesture-Based Solution—Solutions Digital Signage—website. Available at http://www.macrongesture.com/solution_03.html. (Retrieved Sep. 8, 2017).
Macron, Macron's Gesture-Based Solution—Macron's Gesture Recognition website. Available at http://www.macrongesture.com/news.php?board_name=news. (Retrieved Sep. 8, 2017).
Macron, Virtual Mouse for PC—YouTube. Published Dec. 18, 2013. Available at https://www.youtube.com/watch?v=ep9uIrD8DYE&feature=youtu.be. (Acquired Sep. 8, 2017).
Macron, Virtual Mouse for Smart TV. Published Dec. 18, 2013. Available at https://www.youtube.com/watch?v=7J_7u6I8JbK8&feature=youtu.be. (Acquired Sep. 8, 2017).
Geektime, Pebbles Interfaces—YouTube. Published May 11, 2015. Available at https://www.youtube.com/watch?v=96orf5sqBXc. (Acquired Sep. 7, 2017).
Pilot AI Labs, Real-time Localization from Webcam—YouTube. Published Nov. 5, 2015. Available at https://www.youtube.com/watch?v=_PY6VIZ154A. (Acquired Sep. 8, 2017).
Swinguru, Chloé Leurquin—Swincuru Pro Presentation—YouTube. Published Nov. 25, 2014. Available at https://www.youtube.com/watch?v=M3tbobua-_E. (Retrieved Sep. 8, 2017).
Usens, Inc, Fingo demo: Grab and throw—YouTube. Published Aug. 1, 2016. Available at https://www.youtube.com/watch?v=uI97NtJYHRc. (Acquired Sep. 8, 2017).
Usens, Inc, Fingo Demo: Stick—YouTube. Published Aug. 1, 2016. Available at https://www.youtube.com/watch?v=vFZ_sm-Icno. (Acquired Sep. 8, 2017).
Stone, A et al, Teaching Compositionality to CNNs, (Submitted on Jun. 14, 2017), acquired Sep. 8, 2017 from https://arxiv.org/abs/1706.04313.
Kansky, K et al, Schema Networks: Zero-shot Transfer with a Generative Causal Model of Intuitive Physics, (Submitted on Jun. 14, 2017), acquired Sep. 8, 2017 from https://arxiv.org/abs/1706.04317.
Vicarious, Vicarious | Blog—website. Available at https://www.vicarious.com/general-game-playing-with-schema-networks.html. (Retrieved Sep. 6, 2017).
Vicarious, Vicarious | Home | AI for the robot age—website. Available at https://www.vicarious.com/. (Retrieved Sep. 6, 2017).
XYZ Interactive, Home—sensors by xyz interactive—website. Available at http://www.xyzinteractive.com/. (Retrieved Sep. 11, 2017).
Jamie Shotton, et al., Real-Time Human Pose Recognition in Parts from Single Depth Images, Proceedings of CVPR, Jun. 2011, IEEE, United States.
Jamie Shotton, et al., Efficient Human Pose Estimation from Single Depth Images, Trans. PAMI, 2012, IEEE, United States.
Microsoft, Inc., Kinect for Windows—Human Interface Guidelines v2.0, Available at http://download.microsoft.com/download/6/7/6/676611B4-1982-47A4-A42E-4CF84E1095A8/KinectHIG.2.0.pdf (retreived Jun. 29, 2018).
Apple, Inc., Handlind_Swipe_Gestures_Apple, Available at https://developer.apple.com/documentation/uikit/touches_presses_and_gestures/handling_uikit_gestures/handling_swipe_gestures (retrieved Jun. 29, 2018).
U.S. Appl. No. 15/838,228, filed Dec. 11, 2017.
U.S. Appl. No. 16/029,617, filed Jul. 8, 2018.
LIBSVM Tools, Available at https://www.csie.ntu.edu.tw/~cjlin/libsvmtools/. (Retrieved Feb. 6, 2017).
Liblinear—A Library for Large Linear Classification. Available at https://www.csie.ntu.edu.tw/~cjlin/liblinear/. (Retrieved Feb. 6, 2017).
Ren, Shaoqing, et al. "Global refinement of random forest." 2015. Available at http://www.cv-foundation.org/openaccess/content_cvpr_2015/papers/Ren_Global_Refinement_of_2015_CVPR_paper.pdf. (Retrieved on Feb. 8, 2017).
Leo Breiman, Random Forests. 2001. Available at https://www.statberkeley.edu/~breiman/randomforest2001.pdf. (Retrieved Feb. 8, 2017).
Chih-Chung Chang, et al., LIBSVM: A Library for Support Vector Machines. 2011. Available at http://www.csie.ntu.edu.tw/~cjlin/papers/libsvm.pdf. (Retrieved Feb. 8, 2017).
Dong Chen, et al., Blessing of Dimensionality: High-dimensional Feature and Its Efficient Compression for Face Verification. 2013. Available at http://jiansun.org/papers/CVPR13_HighDim.pdf. (Retrieved Feb. 8, 2017).
Simon Bernard, et al., Dynamic Random Forests. 2012. Available at https://hal.archives-ouvertes.fr/hal-00710083/document. (Retrieved Feb. 8, 2017).
Simon Bernard, et al., Forest-RK: A New Random Forest Induction Method. 2009. Available at https://hal.archives-ouvertes.fr/hal-00436367/document. (Retrieved Feb. 8, 2017).
Juergen Gall, et al., Class-Specific Hough Forests for Object Detection. 2009. Available at http://projectsweb.cs.washington.edu/research/insects/CVPR2009/objdetrec/hughforest_objdetect.pdf. (Retrieved Feb. 8, 2017).
Manish Mehta, et al., MDL-based Decision Tree Pruning. 1995. Available at https://www.aaai.org/Papers/KDD/1995/KDD95-025.pdf. (Retrieved Feb. 8, 2017).
Rong-En Fan, et al., Liblinear: A Library for Large Linear Classification. 2008. Available at http://www.csie.ntu.edu.tw/~cjlin/papers/liblinear.pdf. (Retrieved Feb. 8, 2017).
Y. Amit and D. Geman, Shape quantization and recognition with randomized trees. 1996. Available at http://www.wisdom.weizmann.ac.il/~vision/courses/2003_2/shape.pdf. (Retrieved Feb. 23, 2017).

(56) References Cited

OTHER PUBLICATIONS

J. R. Quinlan, Induction of decision trees. 1986. Available at http://hunch.net/~coms-4771/quinlan.pdf. (Retrieved Feb. 23, 2017).

B. A. Shepherd, An appraisal of a decision tree approach to image classification. 1983. Available at https://pdfs.semanticscholar.org/98e4/5102842acb101d66dc53dc898877d34a54b8.pdf. (Retrieved Feb. 23, 2017).

K. K. Biswas et al., "Gesture Recognition Using Microsoft Kinect®". 2011. Available at http://ai2-S2-pdfs.s3.amazonaws.com/92b4/c8655484b603e33aea87e90ba598989ce069.pdf (Retrieved Jul. 5, 2017).

International Search Report & Written Opinion, PCT/US2017/027449; dated Jun. 27, 2017; 24 Pages.

International Search Report & Written Opinion, PCT/US2017/027371; dated Jul. 7, 2017; 24 Pages.

Li et al., "Action recognition based on a bag of 3D points", Jun. 13-18, 2010, 2010 IEEE Computer Society Conference on Computer Vision and Pattern Recognition—Workshops, CVPRW 2010, pp. 9-14 (Year: 2010).

505

510

```
1    receive all of the sample sets
2    initialize the matrix M whose rows will represent the linear system of equations
3    initialize the vector Rots that will hold the list of rotation transforms
4
5    for each sample set S0 in all of the sample sets
6    {
7            for each of the cameras C0, beginning with the primary camera
8            {
9                    if data is not available in S0 for this camera C0
10                           continue;
11                   for each of the secondary cameras C1 after C0 not yet considered
12                   {
13                           if data is not available in S0 for this camera C1
14                                   continue;
15                           if C0 is the primary camera
16                                   add a row to M in accordance with Equation 5
17                           else
18                                   add a row to M in accordance with Equation 8
19                   }
20           }
21   }
22
23   Solutions = Solve_Linear_System(M);
24
25   for each of the cameras C
26           assign corresponding transform from Solutions to camera C in Rots
```

*FIG. 10*

```
1   receive all of the sample sets
2   initialize the matrix M whose rows will represent the linear system of equations
3   receive vector Rots containing the rotation transforms for each camera
4   determine/receive the vector Means with the planar points for each sample set
5   initialize the vector Trans that will hold the list of translation transforms
6
7   for each sample set S0 in all of the sample sets
8   {
9      for each of the secondary cameras C0
10     {
11        apply C0's transform in Rots for C0's mean in Means for this sample set S0
12     }
13
14     determine/receive the normal vector for this sample set S0
15
16     for each of the cameras C0, beginning with the primary camera
17     {
18        if data is not available in S0 for this camera C0
19           continue;
20        for each of the secondary cameras C1 after C0 not yet considered
21        {
22           if data is not available in S0 for this camera C1
23              continue;
24           if C0 is the primary camera
25              add a row to M in accordance with Equation 12
26           else
27              add a row to M in accordance with Equation 13
28        }
29     }
30  }
31  Solutions = Solve_Linear_System(M)
32  for each of the cameras C
33     assign corresponding transform from Solutions to camera C in Trans
```

FIG. 13

| | | | | | | | | | | 1405 |
|---|---|---|---|---|---|---|---|---|---|---|
| Row 1 | $n_{x1}^1$ | $n_{y1}^1$ | $n_{z1}^1$ | 0 | 0 | 0 | 0 | 0 | 0 | $m_0^1 \cdot n_0^1 - m_1^1 \cdot n_0^1$ |
| Row 2 | 0 | 0 | 0 | $n_{x2}^2$ | $n_{y2}^2$ | $n_{z2}^2$ | 0 | 0 | 0 | $m_0^2 \cdot n_0^2 - m_2^2 \cdot n_0^2$ |
| Row 3 | 0 | 0 | 0 | 0 | 0 | 0 | $n_{x3}^3$ | $n_{y3}^3$ | $n_{z3}^3$ | $m_0^3 \cdot n_0^3 - m_3^3 \cdot n_0^3$ |
| Row 4 | $-n_{x1}^4$ | $-n_{y1}^4$ | $-n_{z1}^4$ | $n_{x2}^4$ | $n_{y2}^4$ | $n_{z2}^4$ | 0 | 0 | 0 | $m_1^4 \cdot n_0^4 - m_2^4 \cdot n_0^4$ |
| Row 5 | $-n_{x1}^5$ | $-n_{y1}^5$ | $-n_{z1}^5$ | 0 | 0 | 0 | $n_{x3}^5$ | $n_{x3}^5$ | $n_{x3}^5$ | $m_1^5 \cdot n_0^5 - m_3^5 \cdot n_0^5$ |
| Row 6 | 0 | 0 | 0 | $-n_{x2}^6$ | $-n_{y2}^6$ | $-n_{z2}^6$ | $n_{x3}^6$ | $n_{y3}^6$ | $n_{z3}^6$ | $m_2^6 \cdot n_0^6 - m_3^6 \cdot n_0^6$ |
| ⋮ | | | | | | | | | | |
| Row N | $n_{x1}^N$ | $n_{y1}^N$ | $n_{z1}^N$ | 0 | 0 | 0 | 0 | 0 | 0 | $m_0^N \cdot n^N - m_1^N \cdot n^N$ |

*FIG. 14*

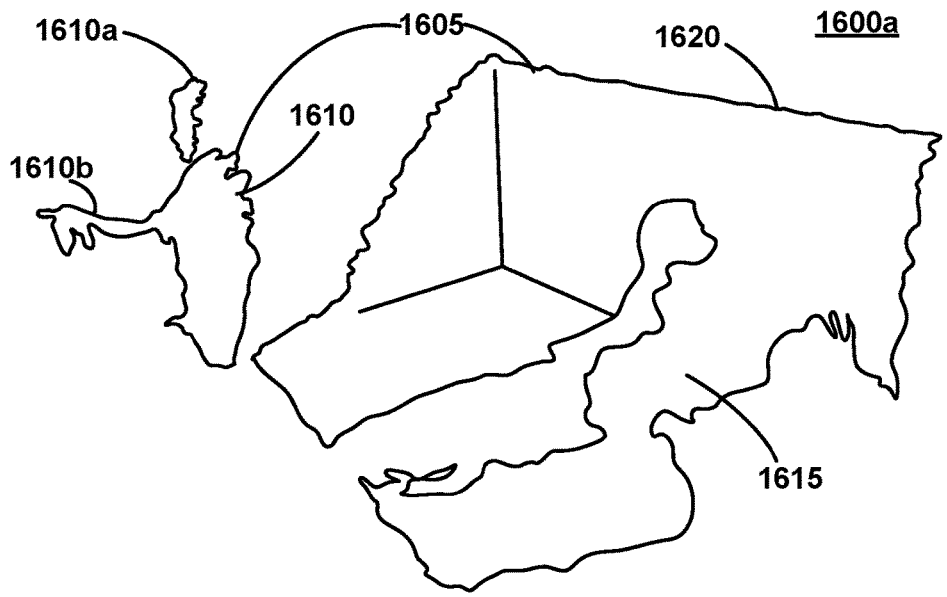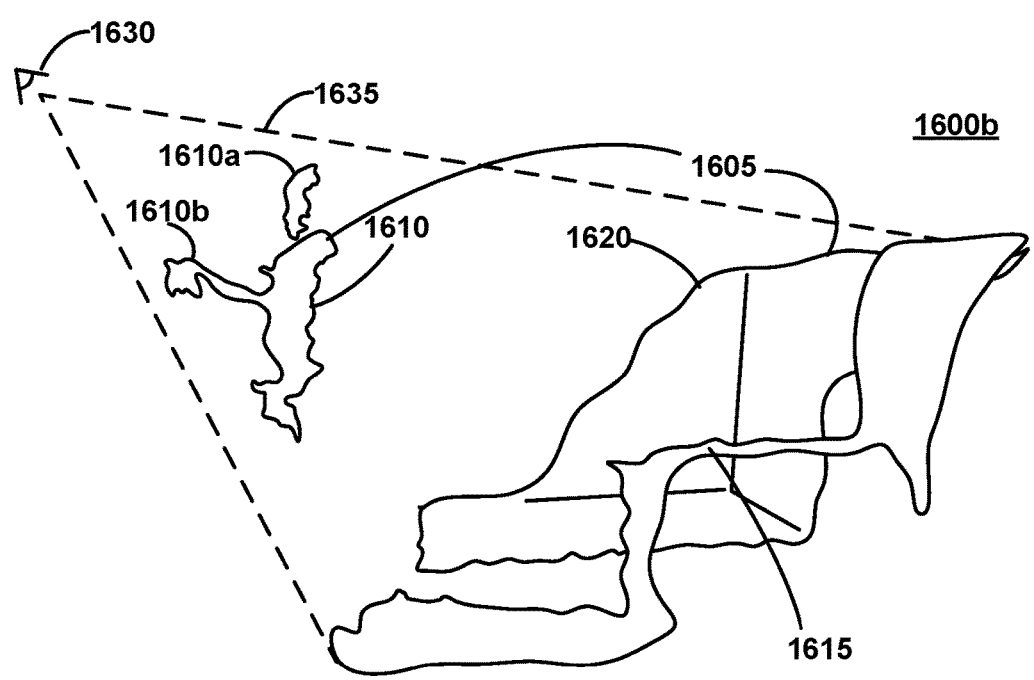
FIG. 16

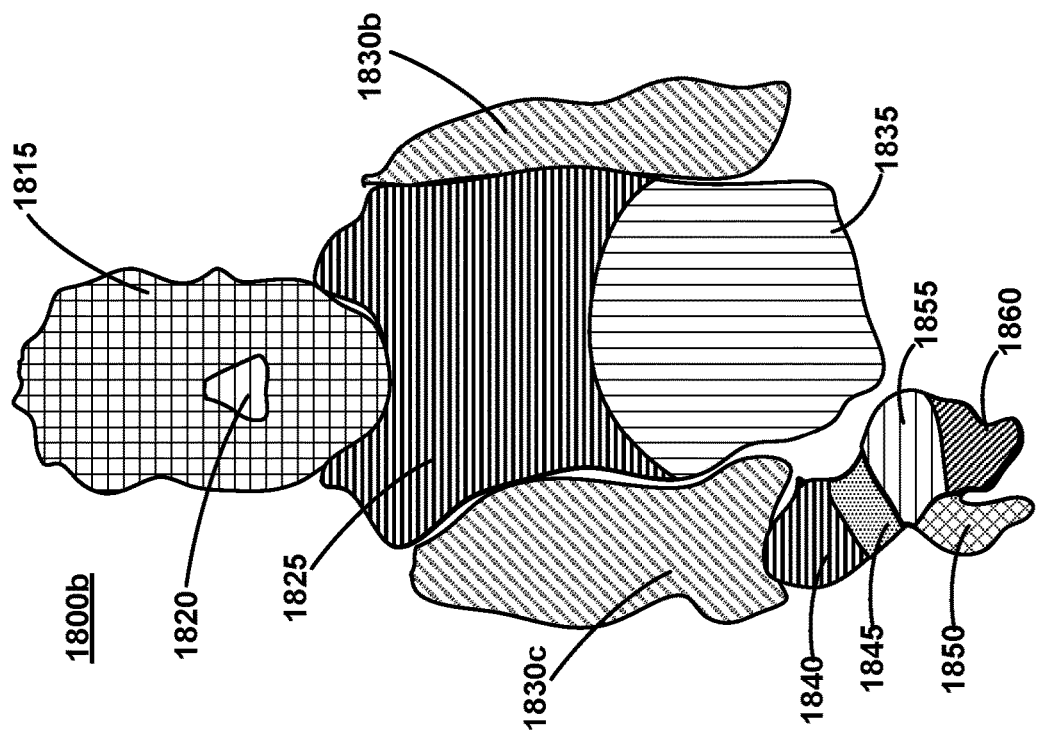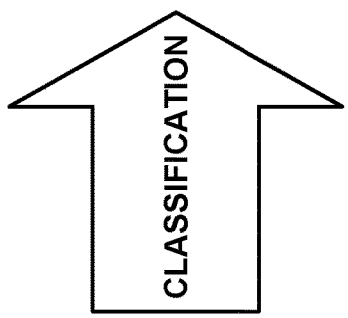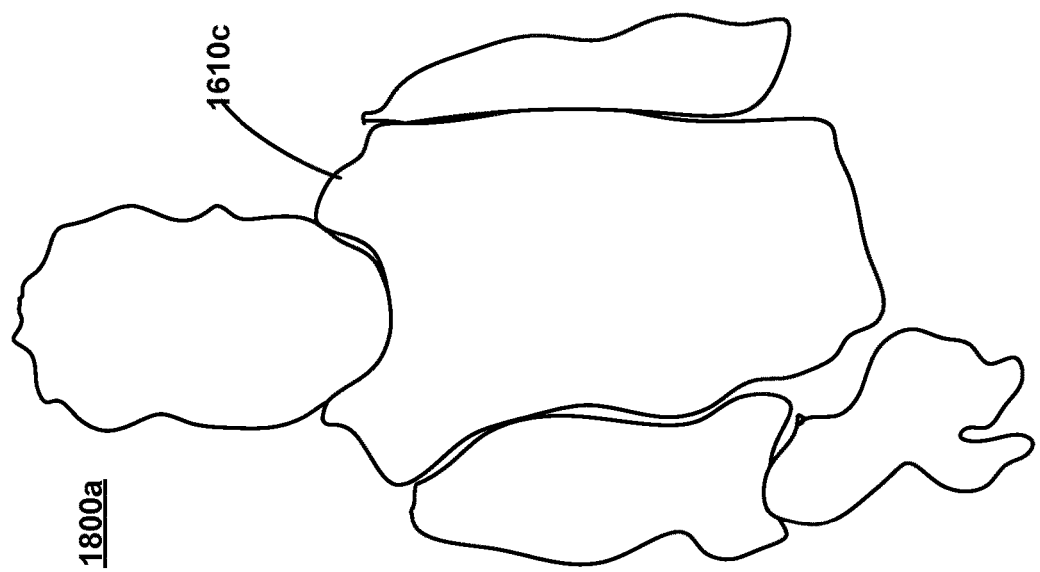
FIG. 18

CALIBRATION SYSTEMS AND METHODS FOR DEPTH-BASED INTERFACES WITH DISPARATE FIELDS OF VIEW

BACKGROUND

Human-computer interaction (HCI) systems are becoming increasingly prevalent in our society. With this increasing prevalence has come an evolution in the nature of such interactions. Punch cards have been surpassed by keyboards, which were themselves complemented by mice, which are themselves now complemented by touch screen displays, etc. Various machine vision approaches may even now facilitate visual, rather than the mechanical, user feedback. Machine vision allows computers to interpret images from their environment to, e.g., recognize users' faces and gestures. Some machine vision systems rely upon grayscale or RGB images of their surroundings to infer user behavior. Some machine vision systems may also use depth-based sensors, or rely exclusively upon depth-based sensors, to recognize user behavior (e.g., the Microsoft Kinect™, Intel RealSense™, Apple PrimeSense™, Structure Sensor™, Velodyne HDL-32E LiDAR™, Orbbec Astra™, etc.).

While depth-based approaches to HCI remove certain problems common to optical systems (e.g., problematic lighting, shadows, user discoloration, etc.) depth-based approaches to HCI may also introduce their own obstacles and complexities. Many depth-based systems may be located within a house, office, shopping center or other environment having dynamic and static qualities. Creating devices and observation platforms that process and interpret data from these environments to extract meaningful data remains quite challenging. Particularly, there is a need to integrate design conditions with mechanical constraints and processing capabilities to achieve a successful user experience. In systems using data from many different depth sensors, it may be necessary to calibrate and interrelate data from each of the depth sensors in a meaningful manner. Such data may also need to be adjusted to account for environmental, dynamic, or structural factors.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 10 is an example pseudocode listing for an example rotation transform determination as may be implemented in some embodiments;

FIG. 13 is an example of a generalized pseudocode listing for an example translation transform determination as may be implemented in some embodiments;

FIG. 14 is a graphical depiction of an example matrix object as may be generated and used in the implementation of some embodiments;

FIG. 16 is a series of perspective and side views of example depth data as may be acquired in some embodiments;

FIG. 18 is an example component classification as may be applied to the isolated data of FIG. 17 in some embodiments;

Figure 1A:
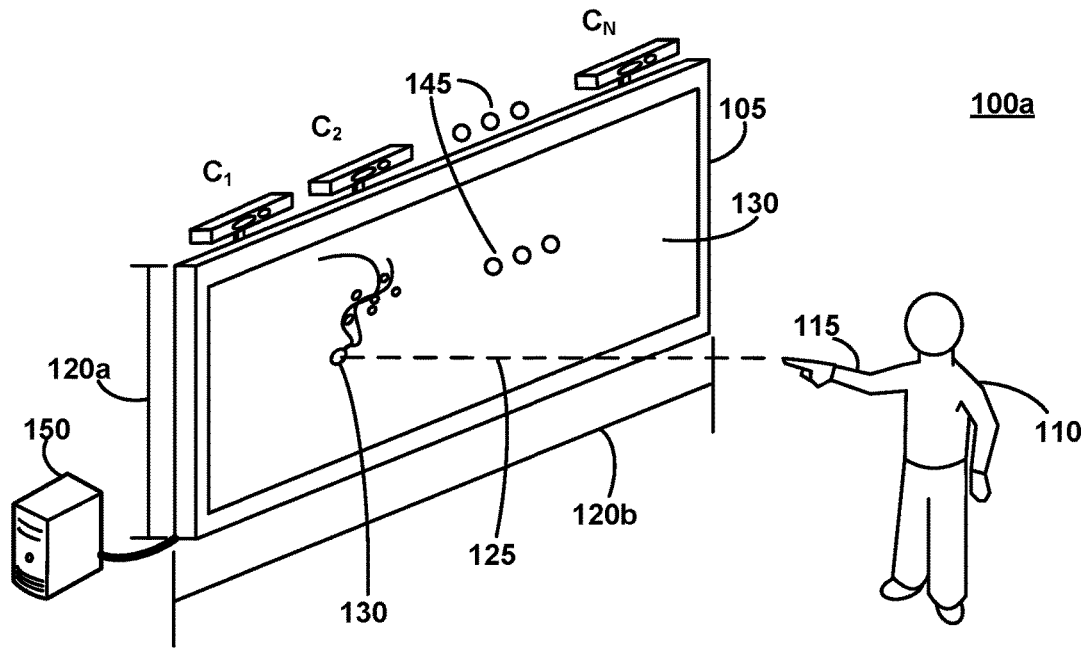
FIG. 1A is a perspective use case diagram illustrating an example user interaction with an example display structure as may occur in some embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here and may be performed in a different order of operations than that depicted here. Thus, some components and/or operations may be separated into different blocks or combined into a single block in a manner other than as depicted. The intention is not to limit the embodiments to the particular examples described or depicted. On the contrary, the embodiments are intended to cover all modifications, equivalents, and alternatives falling within the scope of the disclosed examples.

DETAILED DESCRIPTION

Inter-Sensor Calibration—Example Use Case Overview

Various of the disclosed embodiments contemplate user interactions with a feedback system comprising two or more depth sensors. The depth sensor devices may also include visual image sensors, e.g., RGB sensors, in some embodiments. For example, FIG. 1A is a perspective use case diagram illustrating an example user interaction 100a with an example display structure 105 as may occur in some embodiments. The display structure 105 may be placed in a mall, shopping center, grocery, check-in line, etc. In some embodiments, the height 120a is at least as large as a user 110 or slightly larger, e.g., 7-10 feet. The length 120b may be several times the user's 110 width, e.g., to facilitate an interaction as the user 110 walks the length of the display structure 105.

The example display structure 105 includes a screen 130. The screen 130 may comprise a single large screen, multiple smaller screens placed adjacent to one another, a projection, etc. In one example interaction, the user may gesture 115 at a portion of the screen and the system may present a visual feedback, such as a cursor 130 at a location corresponding to the gesture's projection 125 upon the screen. The display structure 105 may monitor the user's 110 movement and gestures using a plurality of one or more depth sensors $C_1$, $C_2$, . . . , $C_N$. In the example depicted in FIG. 1, at least three cameras are present. The ellipses 145 indicate that more than three cameras may be present in some embodiments, and the length 120b of the display structure 105 may be adjusted accordingly. In this example, the sensors are evenly spaced across the top of the display structure 105, though in some embodiments they may be unevenly spaced.

Figure 1B:
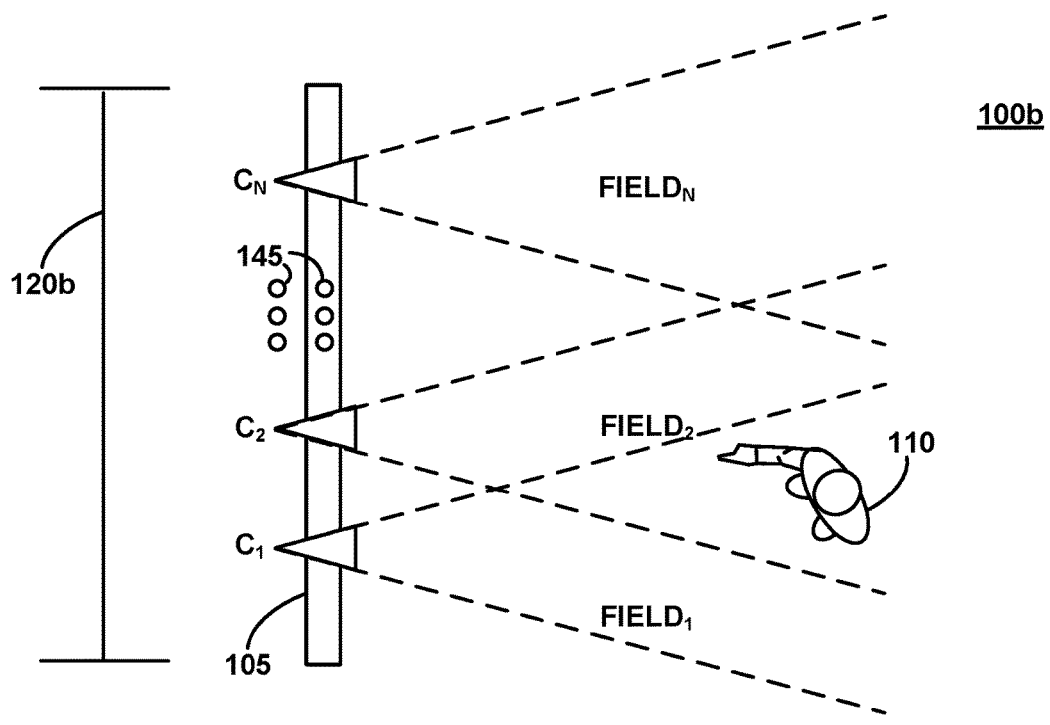
FIG. 1B is an abstracted top-down view of the use case presented in FIG. 1A.

FIG. 1B is an abstracted top-down view 100b of the use case presented in FIG. 1A. Particularly, this view demonstrates that each of the depth sensors is associated with a corresponding field of view. The fields of view may be "conical", emanating from the depth sensor. The fields of view may overlap, as depicted in this example. Particularly, the user 110 is at a position such that they are in the fields of view of both sensors $C_1$ and $C_2$, i.e., fields $FIELD_1$ and $FIELD_2$, respectively.

Though the terms "camera" and "sensor" may be used interchangeably in this application, one will recognize that the depth sensor need not be or facilitate the "camera capture" of optical images, e.g., RGB or grayscale images, though the depth sensor may additionally include that functionality.

To facilitate understanding, FIG. 1 also illustrates a computer system 150 electrically coupled with the display structure 105, which may be used for performing, at least in part, various of the calibration operations disclosed herein. While shown explicitly separate and wirelessly connected in FIG. 1, one will recognize that in many embodiments, the computer system 150 may be, e.g., wired or wirelessly connected with the display structure 105, present remotely via a network connection or on-site with the display, integrated within the display structure 105, integrated within one or more of cameras $C_1$-$C_N$, etc., or a combination of any two or more of these topologies. In some embodiments, the computer system 150 may be specifically designed to facilitate calibration, e.g., in the form of a preprogrammed chip, circuit, Field Programmable Gate Array (FPGA), etc.

Inter-Sensor Calibration—Example Sensor Correspondence

It may be extremely non-trivial to reconcile depth-data gathered at one sensor with the depth data gathered at another sensor. Unfortunately, such reconciliation may be necessary to perform more advanced gesture-based user interactions (e.g., as when a user runs down the length 120b of the display structure 105, performing gestures with both hands that are only separately identified across multiple sensors in time).

Figure 2:
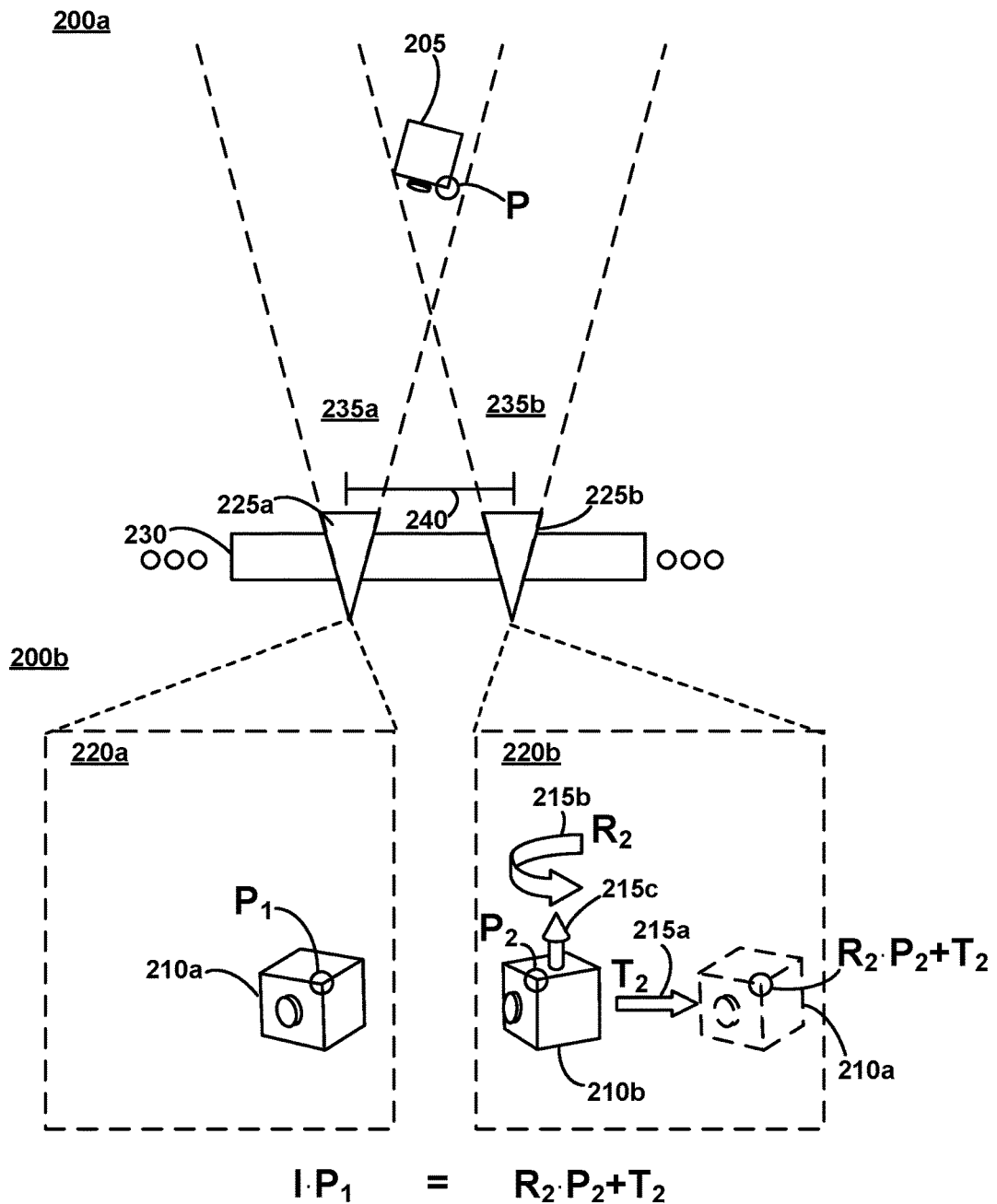
FIG. 2 is a top down view of an example structure having two depth sensors, as well as transformed perspective views of an object perceived at each of the two depth sensors as may occur in some embodiments.

To clarify the nature of certain of these difficulties, FIG. 2 presents a top down view 200a of an example structure having two depth sensors 225a and 225b, as well as transformed perspective views 200b of an object perceived at each of the two depth sensors as may occur in some embodiments. Particularly, consider an arbitrary object 205, shown here as a cube having a circular extension on one surface, lying on the floor before the example display structure 230. This example structure 230 has two sensors 225a and 225b spaced a distance 240 from one another and oriented so as to look down from the top of the example structure 230 towards the floor. Consequently, sensor 225a will have a corresponding field of view 235a which will generate a depth frame 220a wherein the arbitrary object 205 appears in a first orientation 210a within the depth frame. In this orientation, a point P at the corner of the arbitrary object 205 may appear at the position $P_1$ within the frame 220a. Similarly, the sensor 225b may have a corresponding field of view 235b which will generate a depth frame 220b wherein the arbitrary object 205 appears in a second orientation 210b within the depth frame. In this orientation, the point P at the corner of the arbitrary object 205 may appear at the position $P_2$, within the frame 220b. As a consequence of the displacement 240, the resulting parallax and other geometric factors may transform the points in one depth frame (e.g., 220b) relative to another (e.g., 220a—note that the depicted transformation is exaggerated in this illustration to facilitate understanding). Particularly, the representation of the object 205 at the orientation 210a from the orientation at 210b may be achieved by applying a transformation comprising various translations 215a and rotations 215b to objects as they appear in frame 220b. Note that the rotations 215b may occur around more than one axis than just axis 215c as depicted in this example and may be about the origin or other suitable point, rather than the point indicated in this figure to facilitate understanding. For example, the rotation 215b may be about the origin of the camera's field of view as discussed in greater detail below with reference to FIGS. 3 and 4.

Such rotation and translation transformations may be especially severe when the depth sensors are placed at very different orientations relative to one another. For example, in some embodiments the structure 230 may be curved along its length, and the depth sensors may be placed at varying heights and/or rotations as discussed in greater detail herein.

To meaningfully interpret data from each of the sensors 225a and 225b, it may be desirable to identify a transformation matrix reflecting the translations and rotations that map points in one sensor's depth frame (e.g., 220b) to another sensor's depth frame (e.g., 220a). For example, the sensor 225a may be designated a "primary" sensor to which some or all of the other sensors' data is to be oriented. Sensor 225b, as a sensor whose data is to be transformed, may be referred to as a "secondary sensor". To find the orientation of the point P in frame 220a, relative to frame 220a, is trivial and employs the identity matrix I. To find the orientation of the point $P_2$ in the frame 220a (i.e., the point $P_1$), a rotation matrix $R_2$ would be applied (e.g., by a dot product as illustrated) and offset by a translation vector $T_2$. It follows that:

$$I \cdot P_1 = R_2 \cdot P_2 + T_2 \quad (1)$$

(one will recognize that both the rotation matrix and translation vector may be integrated into a single transformation matrix in some embodiments, e.g., as a transformation in homogenous coordinates, and that the separation of the two used herein is provided, in part, to facilitate understanding).

Figure 3:
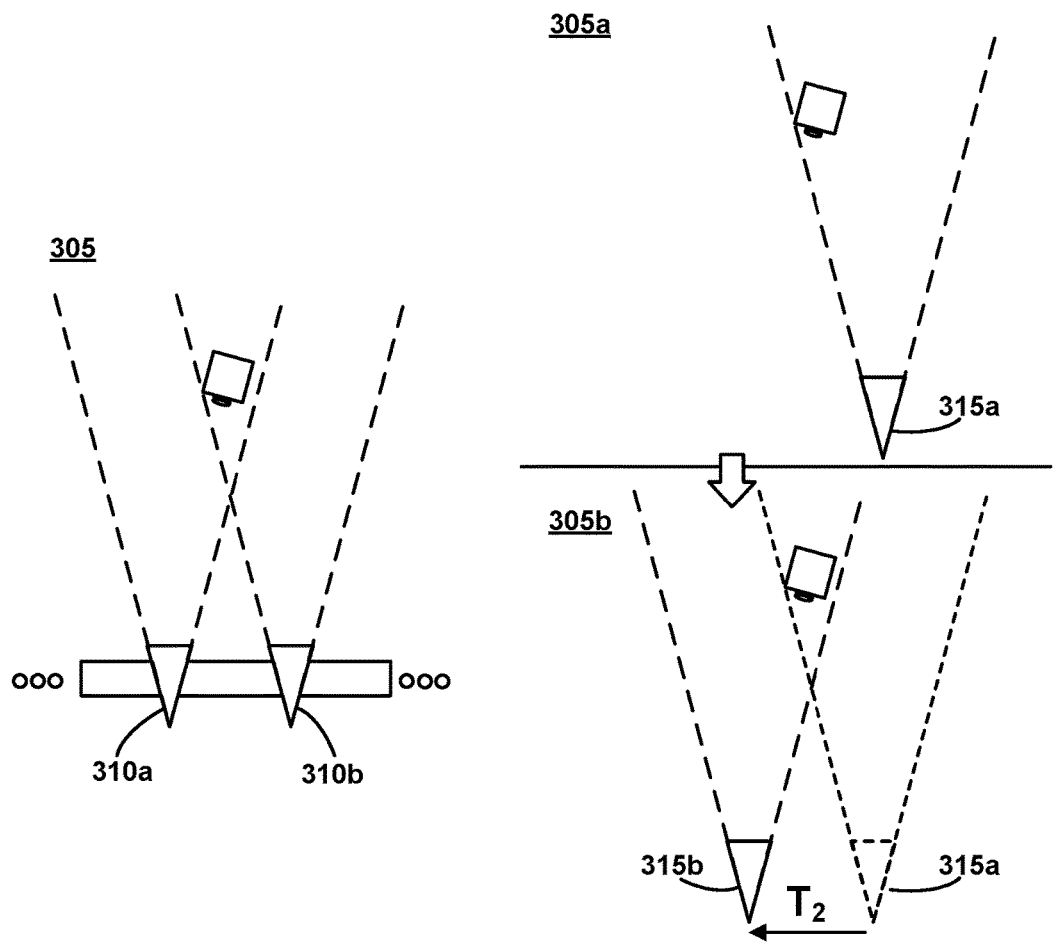
FIG. 3 is a top down view of an idealized example translation operation applied to a secondary camera's data as may occur in some embodiments.
Figure 4:
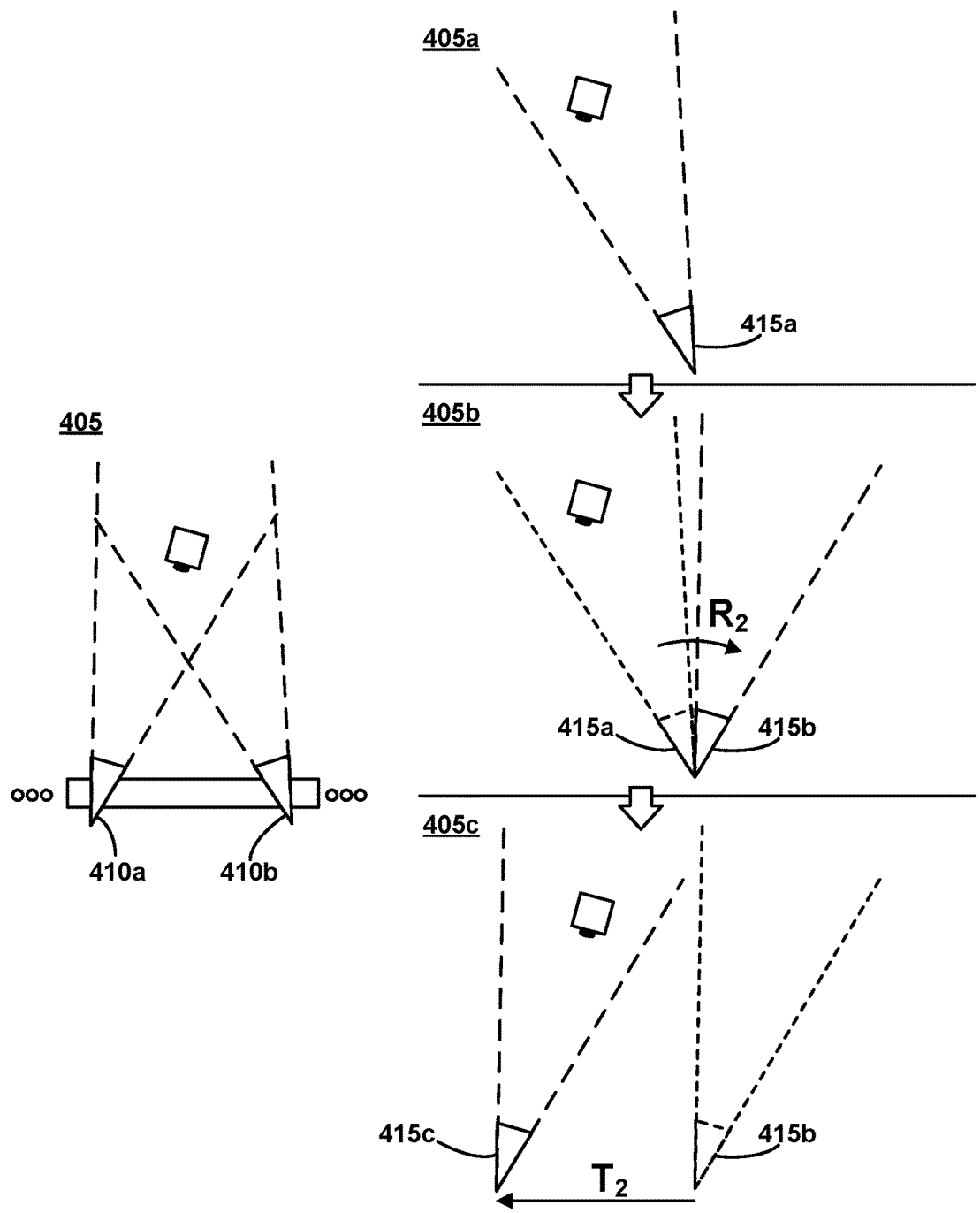
FIG. 4 is a top down view of idealized example translation and rotation operations applied to a secondary camera's data as may occur in some embodiments.

To further facilitate an understanding of these rotation and translation operations, FIGS. 3 and 4 provide abstract representations of a secondary camera's perspective being reoriented to that of a primary camera. Particularly, FIG. 3 is a top down view 305 of an idealized example translation operation applied to a secondary camera 310b to align its view with the field of view of primary camera 310a as may occur in some embodiments. From its initial 305a orientation 315a, the transformation may subsequently 305b apply a translation $T_2$ to relocate object depth values to appear as they would if perceived at the orientation 315b which is equivalent to the orientation of primary camera 310a. As this is an idealized example, only a translation in the plane of the paper is necessary to align the fields of view, though one will recognize that the cameras on the structure of FIG. 1 may also require a rotation, as they may be oriented downward or at other various angles.

To illustrate a transformation including both translation and rotation components, FIG. 4 provides a top down view of an idealized example translation $T_2$ and rotation $R_2$ operation applied to a secondary camera 410b to align its field of view with a primary camera 410a as may occur in some embodiments. From the secondary camera's 410b initial 405a orientation 415a, the transformation may subsequently 405b apply a rotation $R_2$ about the origin to achieve a second orientation 415b. The system may then subsequently 405c apply translation $T_2$ to the origin, to relocate object depth values in the secondary camera's 410b field of view as though they were perceived at the orientation 415c which is equivalent to the orientation of primary camera 410a. Again, though this two-dimensional example is provided to facilitate understanding, one will recognize that in three dimensions additional or different rotations and translations may be used. Similarly, the rotations and translations need not be about the camera's field of view's origin, as represented here, in some embodiments.

Figure 5A:
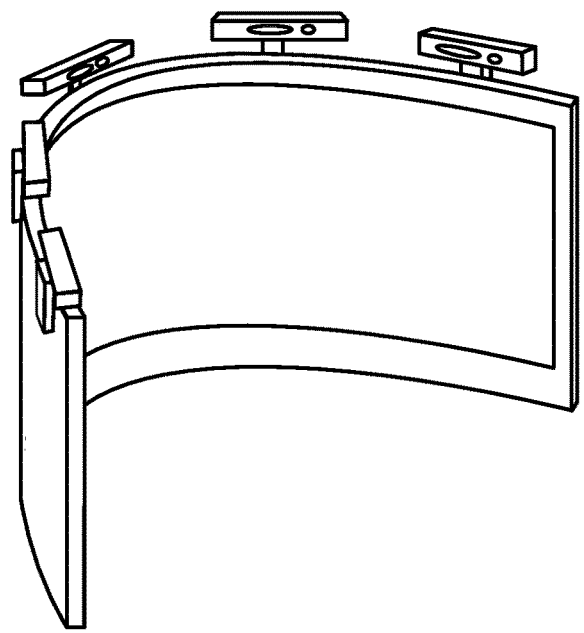
FIG. 5A is a perspective view of an example display structure having a curved surface as may occur in some embodiments.
Figure 5B:
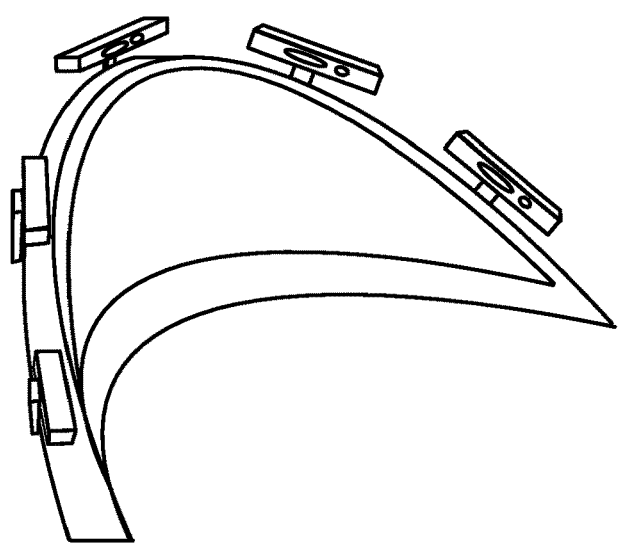
FIG. 5B is a perspective view of an example display structure having a curved surface with varying height as may occur in some embodiments.

Determining the rotation and translation transformations corresponding to each camera may be necessary, or advantageous, to interpret depth data so as to perform more advanced gestural interactions. Such differences may not simply be the result of natural parallax, but may also result from the display's configuration and/or design. For example, FIG. 5A is a perspective view of an example display structure 505 having a curved surface as may occur in some embodiments. FIG. 5B is a perspective view of an example display structure 510 having a curved surface with varying height as may occur in some embodiments. In each of these structures, the positions of the depth sensors may generate frames that view the same objects from dramatically different orientations. By identifying appropriate transformation matrices between the sensors, it may be possible to overcome or improve upon these difficulties and to make use of individual depth captures at each sensor holistically.

Figure 6:
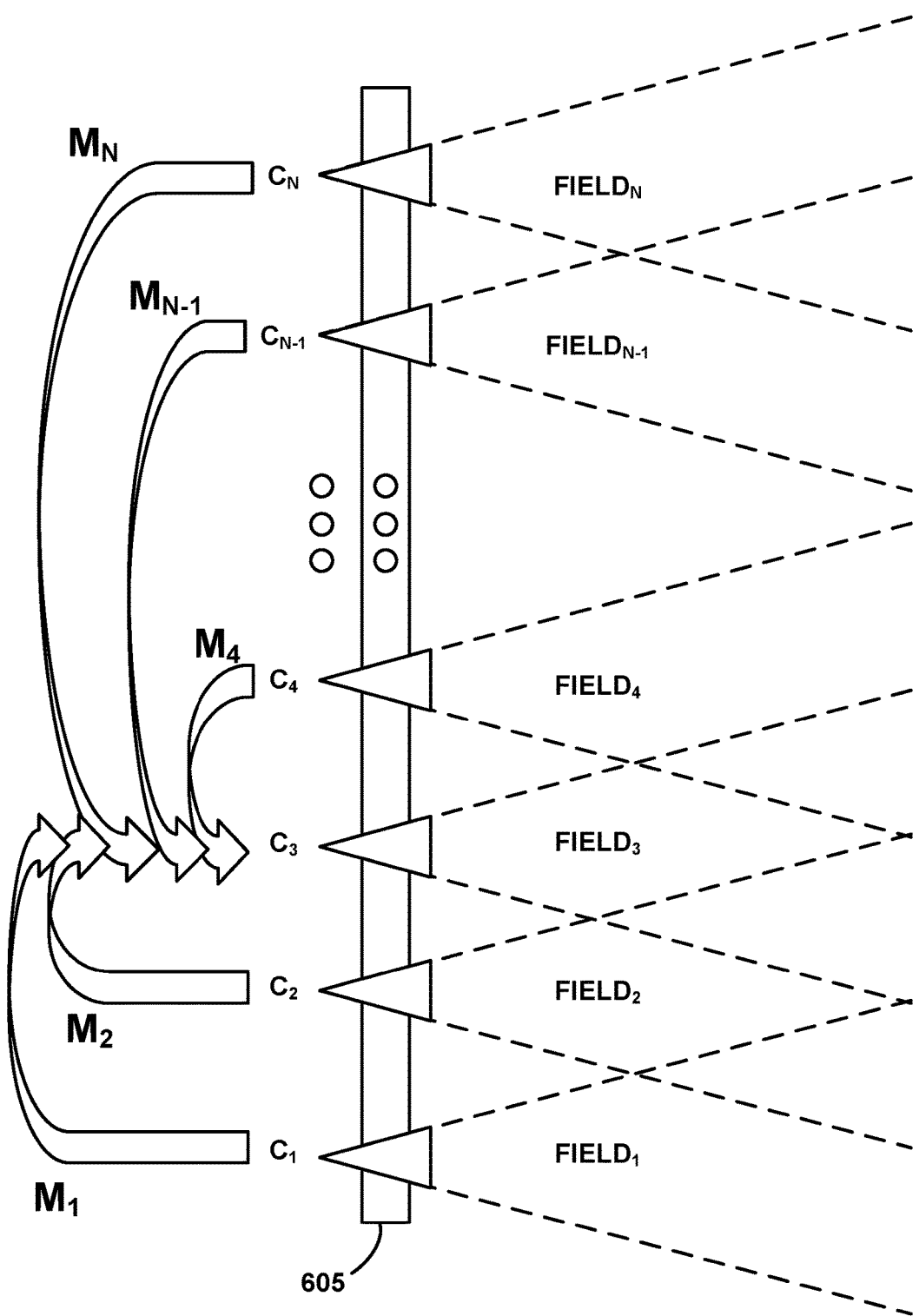
FIG. 6 is a top down view of an example structure having N depth sensors with N corresponding fields of view, as well as the matrix transformations reconciling each sensor with a primary sensor, as may occur in some embodiments.

FIG. 6 is a top down view of an example structure 605 having N depth sensors with N corresponding fields of view, as well as the matrix transformations reconciling each secondary sensor with a primary sensor, as may occur in some embodiments. Particularly, a "primary" sensor may be arbitrarily designated (here, sensor $C_3$). Depth positions identified in other sensors' fields of view ("secondary" sensors) may be mapped to this primary sensor's $C_3$ point of view. Gesture recognition and other processing may then be consolidated relative to the primary sensor's frame of reference, regardless of the depth camera from which the data arose. Note that in some instances the field of view for a sensor may not overlap with the primary sensor's field of view. As long as the secondary sensor's field of view overlaps a partner sensor that is itself partnered with a chain of sensors including the primary sensor, the location relative to the primary sensor may be inferred. Where the sensors form disjoint sets (e.g., where Sensor 1's field of view overlaps with Sensor 2 and Sensor 2 can view a portion of the plane simultaneously with Sensor 3, while Sensors 4-7 can only simultaneously view the plane amongst themselves, but not with any of Sensors 1-3) some embodiments will designate one primary sensor per set, perform separate calibrations, and then relate data from the disjoint sensor sets by considering hardcoded offset information (e.g., factory-provided information regarding the offset positions of the primary sensors on the structure). In this manner, in some embodiments a plurality of "primary" sensors may be fixed at known locations on the display structure, while a plurality of "secondary" sensors associated with each primary sensor can be adjusted or moved by an installation technician.

Thus, for a set of secondary sensors and a primary sensor, a transformation matrix $M_1$ (comprising both a rotation $R_1$ and a translation $T_1$) transforms a position in the field of view $FIELD_1$ of secondary sensor $C_1$ to the corresponding position perceived at primary sensor $C_3$, a transformation matrix $M_2$ (comprising both a rotation $R_2$ and a translation $T_2$) transforms a position in the field of view $FIELD_2$ of secondary sensor $C_2$ to the corresponding position relative to primary sensor $C_3$, etc. Naturally, because the transformations result in the same position in the primary sensor's field of view, they are equivalent, that is:

$$M_1 \cdot p_1 = M_2 \cdot p_2 = M_4 \cdot p_4 = M_{N-1} \cdot p_{N-1} = M_N \cdot p_N = p_3 \quad (2)$$

where $p_3$ is a point relative to the primary sensor $C_3$'s field of view, $p_1$ refers to the position of $p_3$ relative to sensor $C_1$'s field of view, $p_2$ refers to the position of $p_3$ relative to sensor $C_2$'s field of view, etc. Again, the primary camera's transformation matrix in this example will be the identity matrix (i.e., no transform).

Inter-Sensor Calibration—Example

Figure 7A:
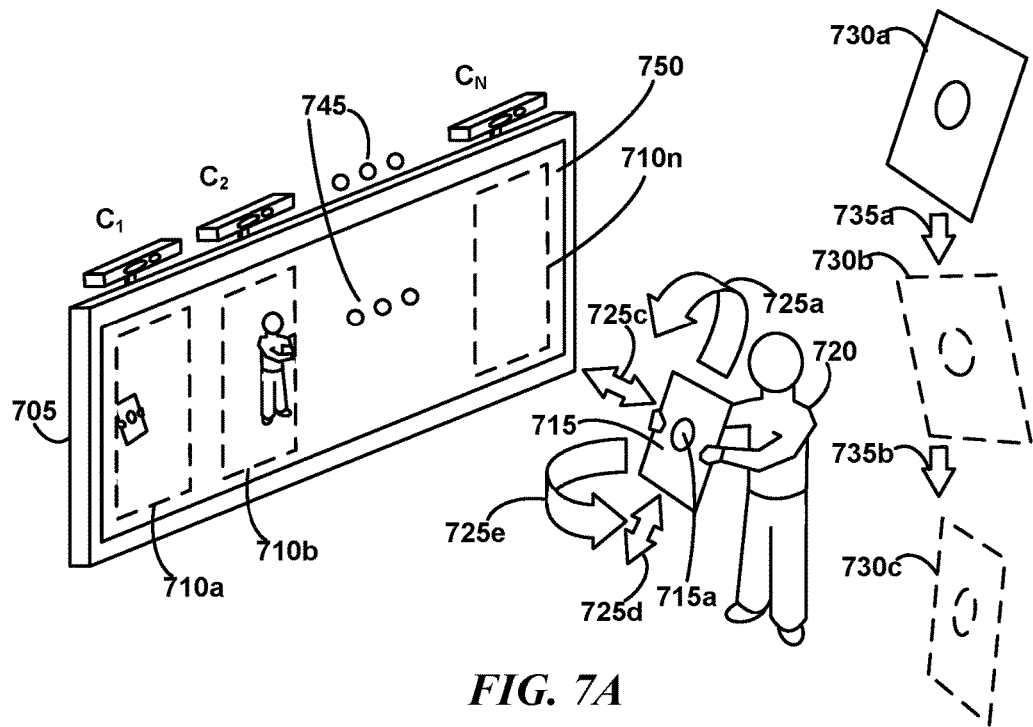
FIG. 7A is a perspective view of an example user-assisted calibration process with an example device as may occur in some embodiments.
Figure 7B:
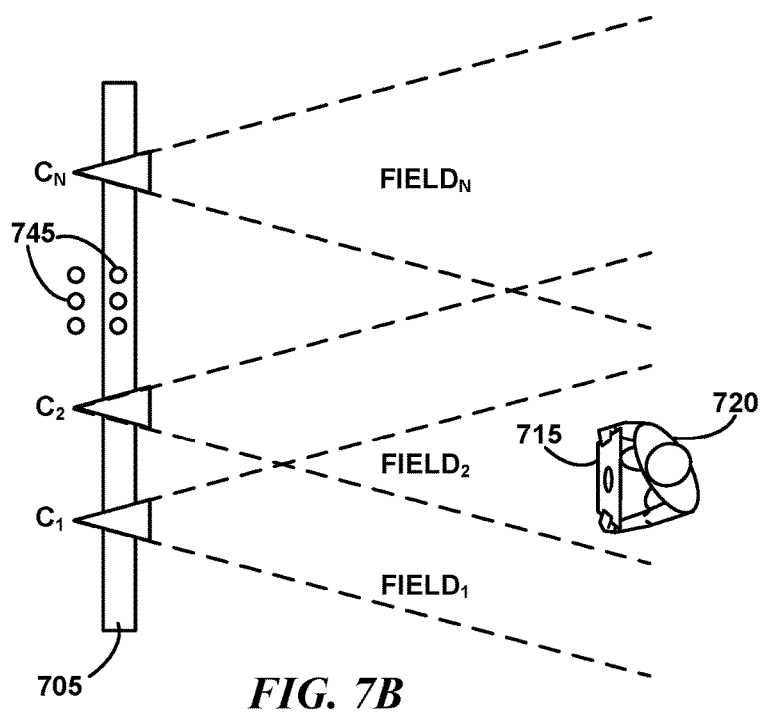
FIG. 7B is an abstracted top-down view of the example user-assisted calibration process and example device of FIG. 7A.

Various embodiments employ user assistance (or assistance by an automated planar presentation system, e.g., a robot) to determine the transformation matrices for each of the cameras. For example, FIG. 7A is a perspective view of a user-assisted calibration process with an example device 705 as may occur in some embodiments (ellipses 745 again depict that the length of the system and number of sensors are variable). FIG. 7B is an abstracted top-down view of the user-assisted calibration process and example device of FIG. 7A. In this example, the calibrating user 720 may hold a planar calibration "board" 715 (though any suitable object providing planar data may be used, including objects which are not themselves planar, but may be used to infer a planar surface, such as a cylinder with grooves or markings) in a variety of orientations. Particularly, the user 720 may stand simultaneously within the fields of view of at least two of the depth sensors and perform a variety of calibration board 715 rotations and possibly translations. In some embodiments, the system may assist the user 720 by presenting, e.g., the RGB image corresponding to the depth sensor's field of view on the display screen 750 (in some embodiments the image may be reversed to make interpretation more intuitive for the user). For example, the system may display sensor $C_1$'s corresponding visual image in portion 710a of the screen 750, sensor $C_2$'s corresponding visual image in portion 710b of the screen 750, sensor $C_n$'s corresponding visual image in portion 710n of the screen 750, etc. (off-screen feedback, such as a television monitor, may be provided instead or in conjunction, in some embodiments). These representations on portions of screen 750 may be accompanied by graphical indicia directing the user 720 how to perform the calibration. For example, a pair of representations may be "highlighted" by color or "marching ants" animation to indicate that the user should move so that the board is in each of the corresponding sensors' fields of view. Once the user is at the appropriate location, the indicia may invite the user to move the board a sufficient number of times. An indicia 715a, such as a circle, on the board 715 may help the user 720 to determine if they are orienting the board appropriately. The circle, or other indicia (e.g., color), may also be used to prevent depth sensors from capturing data from the opposite side of the calibration object in some embodiments (although in some embodiments, both sides may be suitable). Additionally, indicia one side of the planar object may help the system to distinguish the planar object from other items in the environment (e.g., using a corresponding RGB sensor to detect a specific pattern or color on the planar calibration object).

As used herein, a "sample" is a collection of depth values of the planar object at a sensor. Once the system has acquired a sufficient number of depth samples at each sensor for a given sensor pair, the process may repeat for another pair, as the system invites the user to approach a new sensor pair (which may include a sensor from the preceding pair) with the board (though pairs of sensors are used in this example, some embodiments may simultaneously calibrate more than two sensors). In some embodiments, it may not be necessary to explicitly invite the user to rotate the board or approach a given sensor pair, as the user's natural motions will present sufficient translations 725c, 725d and rotations 725a, 725d. Thus, a pair of sensors may be presented with the same planar object in multiple orientations 730a, 730b, 730c due to the user's motions 735a, 735b. One will recognize that a robotic system, or movable platform, may also perform the role of the user depicted in this example. Similarly, in some embodiments the calibration board may be wide enough to fall within all the sensors fields of view simultaneously, reducing the required number of iterations. As mentioned, the "board" may be any suitable planar device, and may be substituted with mechanically decoupled components, still arranged so as to fall within a single planar surface. In some embodiments, the "plane" may be very "thin" (e.g., an elongated rope or rod).

Figure 8A:
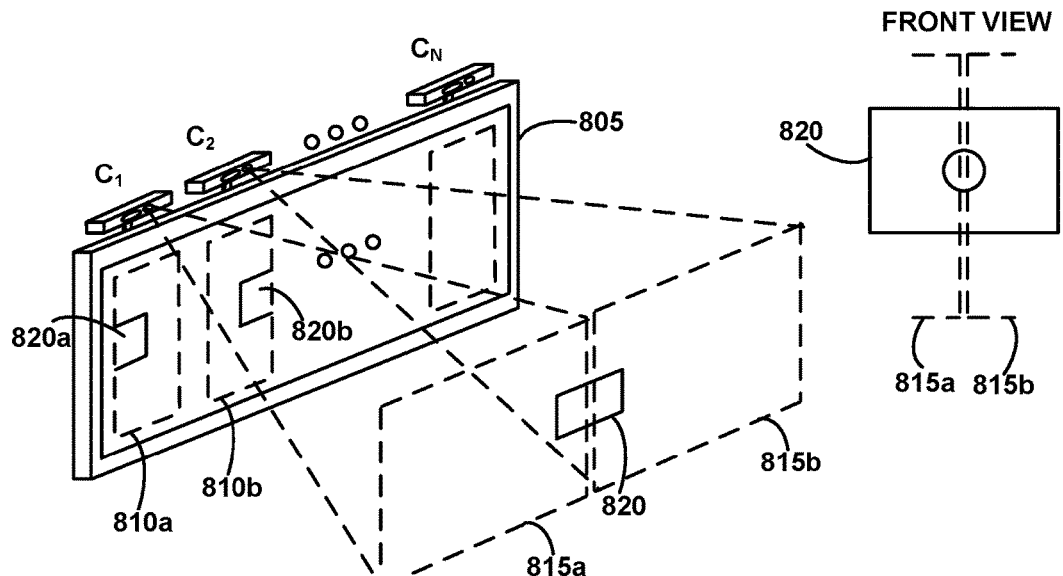
FIG. 8A is a perspective view of an example interaction device wherein two sensors' fields of view simultaneously detect a planar calibration object, as may occur in some embodiments.
Figure 8B:
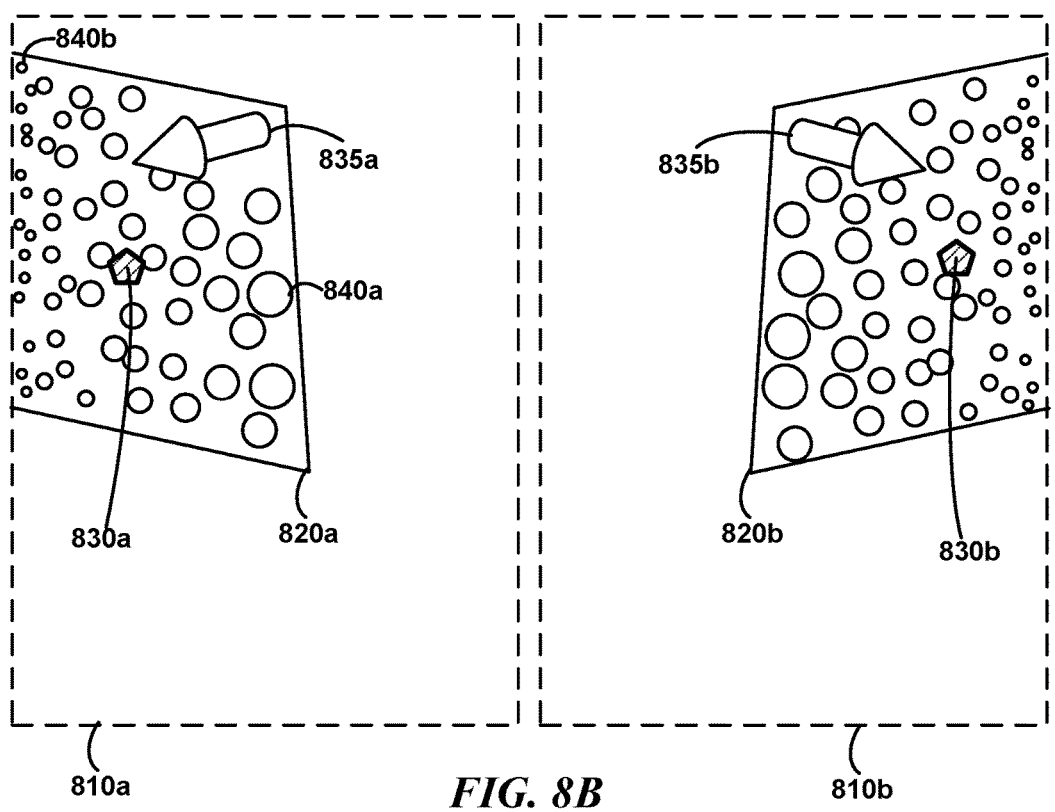
FIG. 8B is an enlarged view of the calibration depth values as well as their corresponding means and normals as perceived at each of the depth sensors of FIG. 8A.

FIG. 8A is a perspective view of an example interaction device 805 wherein two sensors' fields of view simultaneously detect a planar calibration object 820 (e.g., the board 715 of FIGS. 7A and 7B), as may occur in some embodiments. FIG. 8B is an enlarged view of the calibration depth values as well as their corresponding means and normals as perceived and may be determined at each of the depth sensors of FIG. 8A (while the "mean" of the planar depth values may be referenced in examples herein, particularly as the mean may eliminate some noise, one will recognize that any point on the detected plane may suffice for many of the embodiments and need not necessarily be the mean of the depth points). Consider a situation where a user holds the calibration object 820 simultaneously within the fields of view 815a, 815b of cameras $C_1$ and $C_2$ respectively. In this example, the fields of view 815a, 815b do not overlap (though they may in some embodiments) on the calibration object 820, and so the sensors view separate portions of the calibration object 820. If the system is providing visual feedback to the user, then a first portion 820a of the calibration object 820 may appear in a first portion 810a of the screen, while a second portion 820b of the calibration object 820 may appear in a second portion 810b of the screen (though a true RGB image is depicted here, the system may reverse or mirror the image to assist the user in some embodiments).

As shown in the larger view of FIG. 8B, when the calibration object 820 is a board viewed from above by the depth sensors, it may appear as a receding plane. To facilitate understanding, depth values are represented in FIG. 8B by "circles" with circle size inversely proportional to the distance from the depth sensor. For example, the depth value corresponding to the circle 840a is smaller (closer to the depth sensor) than the depth value corresponding to the circle 840b. Provided such data, the system may seek to determine the normal of the plane in each depth sensor frame as well as a point on the plane, such as the mean of the depth values. For example, in frame 810a, the system may determine the mean 830a and normal 835a, while in frame 810b, the system may determine the mean 830b and normal 835b. These means and normals may be stored for subsequent processing as described in greater detail herein (or in some embodiments may be determined only at the time of their use). In some embodiments, each sample includes only the depth values, and after all the desired samples are collected, the system then iterates over them to generate the normals and means. One will recognize that different orders of operations will suffice to achieve the same functional purpose.

Inter-Sensor Calibration—Example Process

Figure 9:
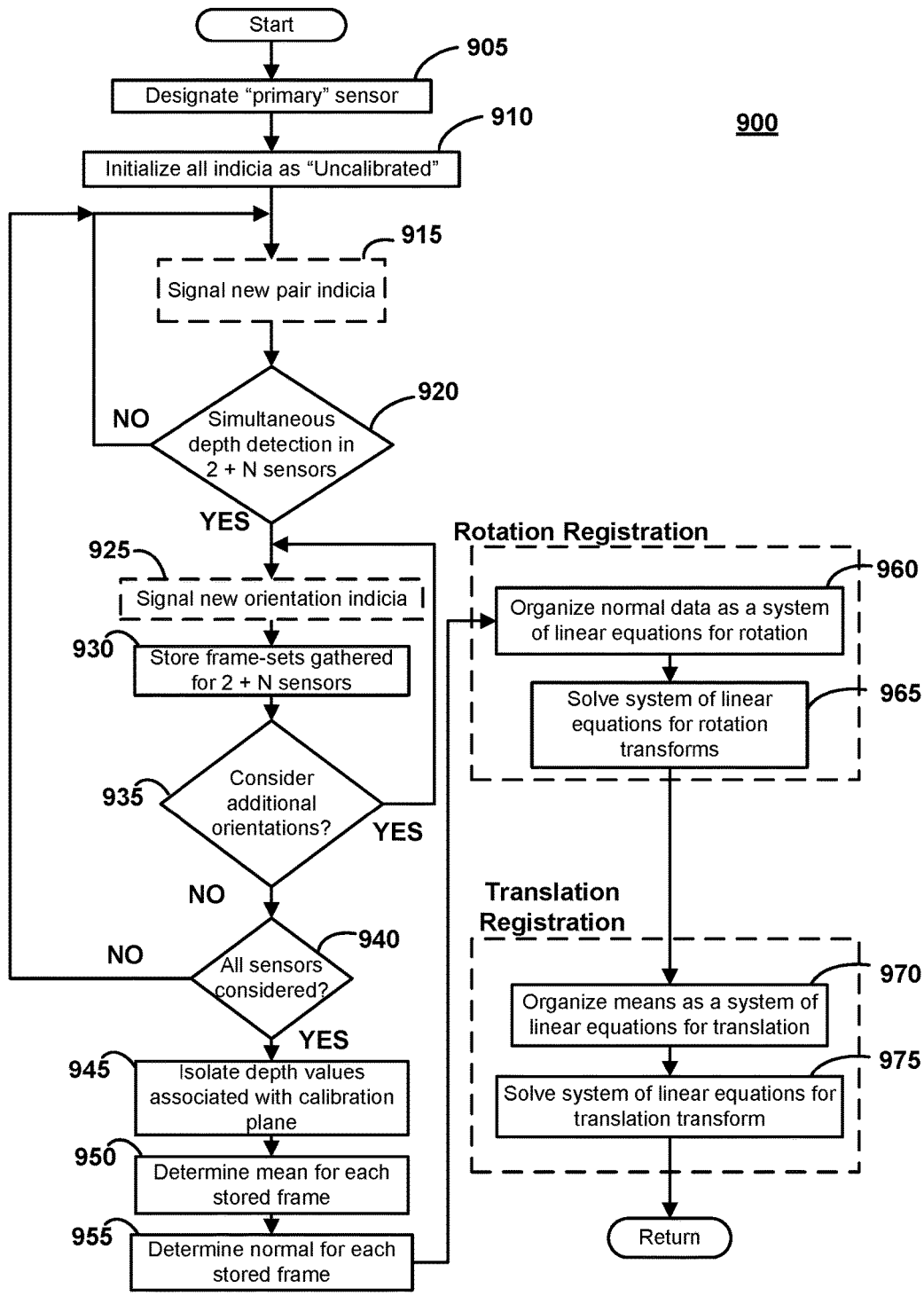
FIG. 9 is a flow chart depicting an example user-assisted calibration process as may occur in some embodiments.

FIG. 9 is a flow chart depicting an example user-assisted calibration process 900 as may occur in some embodiments.

As discussed herein, the operations need not necessarily be presented at the time or in the order depicted, or separated in the manner described, as the choices made in this illustration are selected, rather, to facilitate understanding. At block 905, the system may designate a sensor as a primary sensor. This designation may have occurred prior to the calibration process, e.g., as a factory setting, may be chosen based upon the relative orientations of the sensor, set by an installation technician, or may, e.g., simply be an arbitrary selection in some embodiments.

At block 910, the system may initialize the visual feedback for the user as "uncalibrated" or otherwise direct the user to present the calibration object to a pair of depth sensors (many embodiments, however, will not provide such feedback, or may simply indicate when calibration for all the sensors is complete). For example, initially each of the portions 710*a*, 710*b*, etc., may have colored or animated borders indicating that sufficient samples have not yet been acquired. At block 915, the system may invite the user to present the calibration object for a first, initial pair of sensors. In some embodiments, the system may simply begin capturing frame data once the user presents the calibration object in at least two sensor fields of view. Thus, some embodiments may be more "passive" than "active" embodiments inviting the user to perform calibration operations.

Once the system detects the presence of the depth object (e.g., the calibration board) at block 920, the system may begin detecting, or inferring, the plane and storing the corresponding means and normals (though in this example the depth values are simply stored and the means and normals subsequently determined at blocks 950 and 955, one will recognize that the means and normal may be determined substantially immediately in some embodiments and stored in lieu of the depth frames as described here). For example, in some embodiments the system may invite the user to hold the calibration object in an orientation at block 925, and store the resulting depth values at block 930. This may be accomplished in some embodiments by measuring the angle between all pairs for previously seen normal vectors for a camera. If the largest angle is larger than some threshold (e.g., 45 degrees) then the system may determine that a sufficiently "different" orientation has been presented and recorded.

At block 935, the system may consider additional orientations for the current pair, inviting the user to reorient to calibration object at block 925. As mentioned, however, it may not be necessary to explicitly instruct the user to assume new orientations, as the user's natural movements (e.g., involuntary hand jitter) may suffice to present new normals and means. Each of these distinct, simultaneously captured normals and means may form a sample (the "frame" of depth data from which these normals and points are derived may also be referred to as a "sample"). When sufficient orientations have been considered, the system may determine if a sufficient number of sensors have been considered, e.g., all the sensors with at least one corresponding paired sensor, at block 940. Where a new pair is to be considered, the system may again direct the user to a new pair at block 915, or simply indicate that the current pair is complete (e.g., by adjusting the corresponding animation or colored border, providing audible indicia, etc.).

The system may isolate the depth values associated with the calibration plane from the surrounding background (including, e.g., the user holding the calibration plane, if the user is present). One will recognize that this may occur at various stages, but is shown here at block 945 preceding the means and normals determinations. For example, in some embodiments the calibration plane may be a unique color and the system may isolate depth values corresponding to RGB pixels associated with that color, excluding the remainder from the sample. The means of the calibration plane depth values in each sample may be determined at block 950, e.g., by averaging the depth values along each dimension. Again, though the mean is used herein to facilitate understanding, one will recognize that any point on the plane may suffice in some embodiments. At block 955, the normal to the calibration plane as it appears in the depth value sample may be determined, e.g., from a cross product of vectors lying in a plane corresponding to the depth values. For example, Random Sample Consensus (RANSAC), a least squares regression fit, etc. may all be used to select, modify, or average depth value points to identify appropriate vectors within the plane of the calibration object.

Once the means and normals are available for each of the depth samples, the system may determine the rotation transformation associated with the calibration matrices during "rotation registration" at blocks 960 and 965 and the translation transformation associated with the calibration matrices during "translation registration" at blocks 970 and 975 (though depicted separately here and in the pseudocode examples below, one will recognize that the operations may be combined or reorganized in some embodiments). Particularly, at block 960 the system may organize the determined normals into a linear system of equations and then solve that linear system at block 965 to determine the desired rotation matrix components. At block 970 the system may organize the means into a linear system of equations and then solve that linear system at block 975 to determine the desired translation matrix (or vector) components. The rotation and translation information may be synthesized into a single transformation matrix. The following sections provide example implementations of these rotation and translation determinations (one skilled in the art will also readily recognize many functional equivalents and variations sufficient to implement the remaining blocks 905-955).

Inter-Sensor Calibration—Example Rotation Linear Equation Methodology

The system may consider aspects of the problem context when organizing the sample data into linear equations at block 960. For example, consider a system having four depth sensors (a primary sensor Sensor 0 and secondary sensors Sensor 1, Sensor 2, Sensor 3), which may each be associated with a corresponding rotation transform matrix (I, $R_1$, $R_2$, $R_3$, respectively, where "I" is the identify matrix associated with the primary sensor). As discussed, these rotation transform matrices (I, $R_1$, $R_2$, $R_3$) rotate a normal from the calibration plane as perceived by the corresponding depth sensor to the normal as that normal appears to the primary depth sensor (hence, Sensor 0's transform is the identity matrix). Accordingly, for a single sample capturing data at all the sensors, the following Equation 3 holds:

$$R_1 \cdot n_1 = R_2 \cdot n_2 = R_3 \cdot n_3 = n_0 \qquad (3)$$

That is, for a simultaneous depth data capture at all four sensors, the determined normals would relate to the primary sensor's normal as indicated in Equation 3 (note that the identity matrix is not shown). Note that not all depth sensors may perceive the calibration plane and the system would accordingly omit those sensors from the above equality for that sample set.

In some embodiments, the system may use knowledge of Equation 3 to organize the normals into a system of linear equations, which may then be solved for $R_2$, $R_3$, etc. (e.g., a Singular Value Decomposition, QR Factorization, a Givens Rotation, etc.). Particularly, the system may organize this information into linear equations of the form in Equation 4 presented below:

$$R_1 \cdot v_1 + R_2 \cdot v_2 + R_3 \cdot v_3 = v_0 \qquad (4)$$

where $v_0$, $v_1$, $v_2$, and $v_3$ are arbitrary vectors intended to illustrate the form of the equation. To clarify, one will recognize that Equation 4 is merely the "form" in which the equations will be organized, rather than itself being an assertion of an actual equality. That is, this form will be used to insert truthful relations as described below into a linear system of equations (e.g., not all of $v_1$, $v_2$, and $v_3$ may be non-zero in each insertion). Additionally, while the following example applies to sample sets that include only two simultaneous camera captures to facilitate understanding, one will readily perceive that this example may be extended, mutatis mutandis, to embodiments with more than two cameras per capture (e.g., as described in greater detail below).

Thus, each sample set (a simultaneous collection of depth values at each sensor) may be organized into the form of Equation 4 and then inserted as another row in a matrix of equations to be solved for the respective rotation transforms. Each of the equation rows organizing sample data into the form of Equation 4 may be one of two types: 1) those in which the primary sensor's normal was measured and included in the sample; and 2) those in which the primary sensor's normal was not measured and included in the sample.

For data sample sets that include the primary sensor's normal in at least one of the samples, the system may use Equation 3 to organize the samples into the form in Equation 4 by inserting the primary sensor's normal on the right side of the equation and the available secondary sensor normals on the left. This is indicated in Equation 5 for a sample having data for Sensors 0 and 2, but not Sensors 1 and 3:

$$R_1 \cdot 0 + R_2 \cdot n_2 + R_3 \cdot 0 = n_0 \qquad (5)$$

For data samples that do not include the primary sensor's normal, but only the normals derived at two or more secondary sensors (e.g., because the calibration object was only within their fields of view), the system may again take advantage of Equation 3 (i.e., that each transformation R will map each secondary sensor normal to the same primary sensor normal) to recognize that any two secondary sensor normals in the same sample set will be equal after applying the rotation transform. For example, if the sample produces normals for only Sensors 1 and 3, Equation 6 will hold:

$$R_1 \cdot n_1 = R_3 \cdot n_3 \qquad (6)$$

Equation 6 may be rewritten as shown in Equation 7:

$$R_1 \cdot n_1 - R_3 \cdot n_3 = 0 \qquad (7)$$

This result can then be represented in the form of Equation 4 as depicted in Equation 8 below (note the absence of $n_0$):

$$R_1 \cdot n_1 + R_2 \cdot 0 + R_3 \cdot (-n_3) = 0 \qquad (8)$$

Thus, for samples including the primary sensor the system may generate linear equations such as Equation 5 and for samples that do not include the primary sensor, but only two secondary sensors, the system may generate linear equations such as Equation 8. Each of these equations may then comprise a "row" in a matrix reflecting the system of linear equations to solve.

Inter-Sensor Calibration—Generalized Example Rotation Determination Pseudocode

FIG. 10 is an example pseudocode listing for an example rotation transform determination as may be implemented in some embodiments. At line 1, the system (e.g., a dedicated programmable chip on the display, an off-site computer, etc.) may receive each of the sets of simultaneously acquired samples from the calibration operation (though this example assumes that all the sets have been collected, one will readily recognize variations, such as where the linear equations are populated in real time as calibration data is received). In some embodiments, the sets may be preprocessed to identify the mean and normals of the planar calibration surface. At lines 2-3, the system may initialize (e.g., allocate space for) the matrix that will be used to store the system of linear equations and the vector (or other suitable storage structure) containing each of the solved rotation transforms corresponding to each sensor.

At lines 5-21 the system may iterate through each of the sample sets ("S0" refers to the current sample set under consideration). As discussed, each sample set may comprise the depth values simultaneously perceived at each camera during calibration. Thus, for a given set the system may iterate through the cameras, beginning with the primary camera, which have data in this set (as evidenced by lines 7-10 and 20). Where a sample is present with depth data values of the planar calibration surface (i.e., line 9 is false) the system may iterate through the remaining cameras (lines 11-19), skipping the cameras lacking sample data in this set of samples (i.e., line 13 is false). As the system began with the primary camera, each of the cameras considered in lines 11-19 will be secondary cameras in this embodiment (though one will readily recognize alternative iteration patterns).

Where data is available for both cameras, then the system may append a row within the matrix of linear equations either in accordance with Equation 5 or Equation 8 (lines 15-18) as the case may be (though Equations 5 and 8 only depict two cameras at a time, one will recognize that in some embodiments the row may reflect data from three or more cameras). In this manner, the system may populate the matrix with a system of linear equations, which may then be solved at line 23 using any of the many well-known computational methods (matrix decomposition, Givens rotations, etc.). The solution transforms may then be assigned to their corresponding cameras at lines 25-26 (in this example a vector Rots is used to store the correspondences, but one will recognize many different methods for storing the result, including, e.g., storing a preliminary transform to each camera's depth capture firmware).

Inter-Sensor Calibration—Example Data Structure for Rotation Determinations

Figure 11:
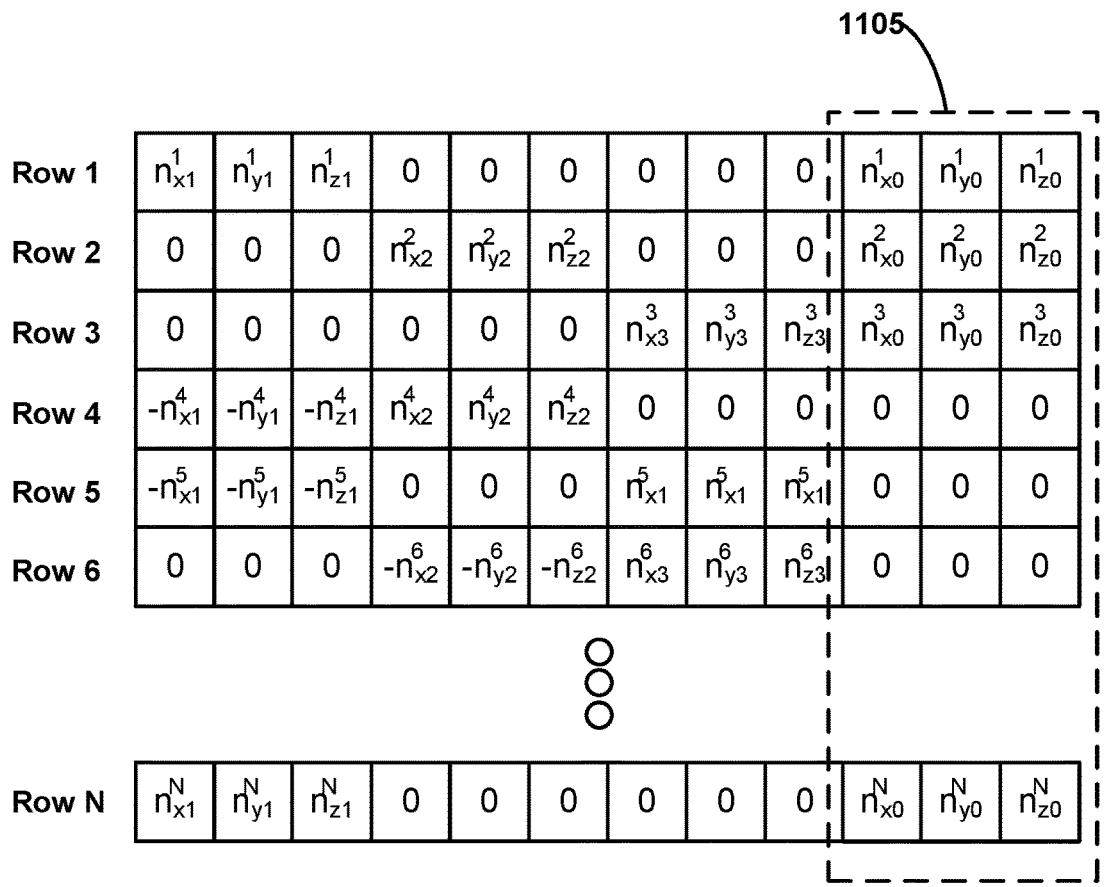
FIG. 11 is a graphical depiction of an example matrix object that may be generated and used in the implementation of some embodiments.

While one will recognize many different ways to implement the embodiments disclosed herein, to facilitate understanding, this section describes an example data structure that may be used in some embodiments. FIG. 11 is a graphical depiction of an example matrix object abiding by the forms of Equations 5 and 8 that may be generated and used in some embodiments. Particularly, this matrix considers the four sensor example discussed above (a primary sensor Sensor 0, and secondary sensors Sensor 1, Sensor 2, Sensor 3). The upper index in each entry indicates the sample set number, while the lower index indicates the dimension and sensor. For example, $n_{y2}^4$ indicates the "y component" associated with "Sensor 2" captured during the "fourth sample set". The columns identified in the region 1105 comprise the right side of the form in Equation 4, while the remaining columns comprise the left side. Thus, Rows 1-3 correspond to samples wherein the primary Sensor 0 and a secondary sensors acquired normals from the calibration plane. These rows accordingly correspond to the form of Equation 5. Similarly, Rows 4-6 indicate samples wherein the system acquired only data for secondary sensors during the sample captures. These rows accordingly correspond to the form of Equation 8. With each dimension considered separately there are 3 (dimensions) each associated with a 3×3 rotation matrix, and so 3*3*3=27 equations to solve in this example. As mentioned above, however, if the system considers natural movement of the user holding the calibration object, there may be thousands of samples—many more than are necessary to solve for the unknown variables. One will readily recognize a variety of conventional linear solvers, which may be applied to this structure (e.g., a matrix decomposition function, Givens Rotation, etc.).

Inter-Sensor Calibration—Example Translation Linear Equation Methodology

Analogous to the organization of the sample data into linear equations at block 960 for rotation discussed above, the organization of the sample data into linear equations at block 970 for determining the translation component of the transformation matrices may similarly consider aspects of the problem context. For example, again consider a system having four depth sensors (a primary sensor Sensor 0 and secondary sensors Sensor 1, Sensor 2, Sensor 3), which may each be associated with a corresponding translation transform matrix (I, $T_1$, $T_2$, $T_3$, respectively, where "I" is the identify matrix associated with the primary sensor). As discussed, these translation transform matrices (I, $T_1$, $T_2$, $T_3$) translate a point from the calibration plane relative to the corresponding secondary sensor to the position of that point relative to the primary depth sensor (again, the primary Sensor 0's transform is the identity matrix).

Figure 12A:
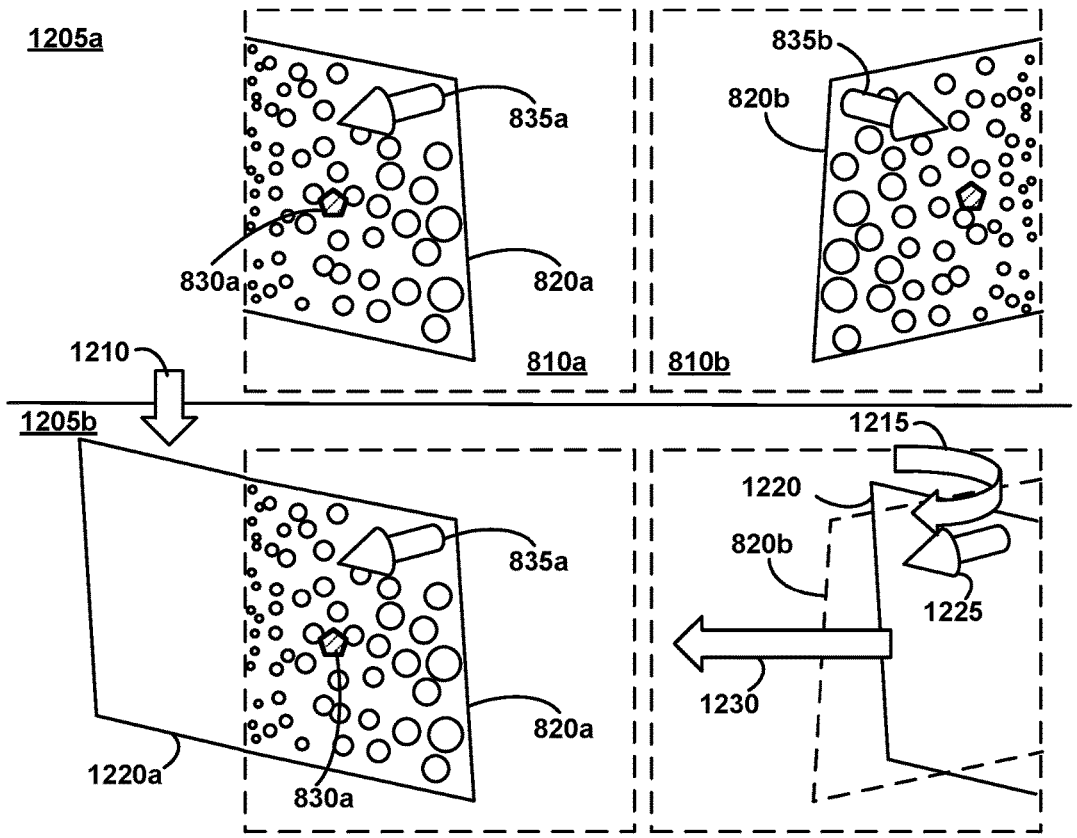
FIG. 12A is an enlarged view of the calibration depth values of FIG. 8B before and after rotation and relative to their translated position as may occur in some embodiments, rendered in a more idealized manner to facilitate understanding.

To facilitate understanding of the translation operations described below, FIG. 12A is an enlarged view of the calibration depth values of FIG. 8B before and after rotation and relative to their translated position as may occur in some embodiments. Particularly, at the time of sample capture 1205*a*, the respective depth fields 810*a*, 810*b* reflect the orientation of the calibration object from each sensor's point of view. At a time 1205*b* after 1210 the rotation 1215 has been applied to the secondary sensor's depth data, a new normal 1225 will result. Generally, normal 1225 may be substantially the same as the normal 835*a* perceived in the primary sensor's field of view 810*a*. Though the depth values are not represented at time 1205*b* again for clarity, one will recognize that the general plane 1220 would assume a new orientation corresponding to the new normal 1225 (one will recognize this operation isn't necessarily performed by the system, but simply discussed here to facilitate understanding). In fact, if the primary and secondary depth sensors exactly divided the calibration plane, then the translation 1230 of the transformation matrix would cause the plane 1220 to form an extension to the region depicted in 810*a* (shown at the position 1220*a*). Though the two plane portions do not overlap in this example, they may overlap or may be distantly separated in other examples. While the mean of the plane depth values has been discussed as the point of reference for determining the appropriate translation 1230, any point on the plane 820*b* may suffice in some embodiments (the below application of the dot product, e.g., would be applicable for any point on the plane). Particularly, the system may compare the projection of a point on the primary sensor's perceived plane and the secondary sensor's perceived plane (post-rotation) to determine the appropriate translation.

Figure 12B:
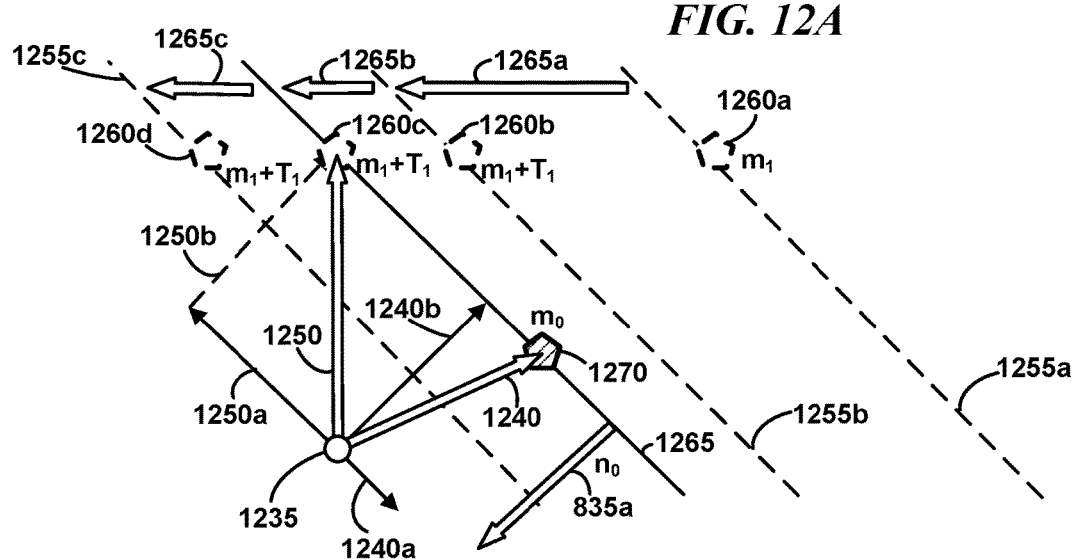
FIG. 12B is a top-down view of the translation of a plane derived from a secondary sensor to coincide with a plane in the primary sensor's field of view, as may occur in some embodiments, rendered in a more idealized manner to facilitate understanding.

For example, to facilitate understanding, FIG. 12B is a top-down view of the translation of a plane derived from a secondary sensor to coincide with a plane in the primary sensor's field of view, as may occur in some embodiments, rendered in a more idealized manner to facilitate understanding. Particularly, the origin of the depth frame field of view for the primary sensor may be at location 1235. The plane 820*a* as perceived at the primary sensor is at position 1265, and the mean $m_0$ 830*a* as perceived at the primary sensor is at position 1270. Consequently, the coordinates of the mean $m_0$ may be represented by the vector 1240. This vector 1240 may itself be decomposed into component vectors 1240*a* and 1240*b*, representing the projection of vector 1240 upon vectors perpendicular and parallel to the normal vector 835*a*, respectively. The component vector 1240*b* also reflects the distance from the origin's location 1235 to the plane 820*a*.

The plane 1220 may, post-rotation, be at a position 1255*a* absent any translation (accordingly the position of the mean viewed at the second sensor $m_1$ is at position 1260*a*). Note that when the appropriate translation has been applied (i.e., both offsets 1265*a* and 1265*b*), the plane 1220 coincides with the plane 820*a*. Accordingly, the vector 1250 from the origin to the mean $m_1$ at the resulting location 1260*c* may be decomposed into component vectors 1250*a* and 1250*b* perpendicular and parallel with normal vector 835*a*, respectively. Note that both component vectors 1240*b* and 1250*b* share the same length (the distance from the origin's location 1235 to the plane). When the translation is incorrect, this is not the case. For example, when the translation has gone too far (e.g., moving the plane to 1255*c* and $m_1$ to the position 1260*d*) this component will be too short. Conversely, when the translation has not gone far enough (e.g., moving the plane to 1255*b* and $m_1$ to the position 1260*b*) the component will be too long.

Thus, the equivalence at the correct translation may be reflected in the following Equation 9:

$$(m_1+T_1) \cdot n_0 = m_0 \cdot n_0 \qquad (9)$$

where $n_0$ is the normal of the plane post-rotation (which all the samples in the sample set may now share).

Equation 9 can then be rewritten as Equations 10a-b:

$$m_1 \cdot n_0 + T_1 \cdot n_0 = m_0 \cdot n_0 \qquad (10a)$$

$$T_1 \cdot n_0 = m_0 \cdot n_0 - m_1 \cdot n_0 \qquad (10b)$$

The information presented in Equation 10b may be reorganized into a standard form that facilitates solving for $T_1$. Particularly, analogous to the linear equations of the form in Equation 4 presented above, a system of linear equations may be generated from the samples in the form of Equation 11:

$$T_1 \cdot p_1 + T_2 \cdot p_2 + T_3 \cdot p_3 = p_0 \qquad (11)$$

where $p_0$, $p_1$, $p_2$, and $p_3$ are arbitrary points and $T_0$, $T_1$, and $T_3$ are the translation transforms for the corresponding secondary sensors. Again, as with Equation 4, Equation 11 reflects the "form" of the linear equations. Also analogous to the linear equations of the form in Equation 4, there will be two situations occurring in the sample sets: 1) one of the two means (or arbitrary points on the plane) in the sample set is from the primary sensor; and 2) the sample set does not include the primary sensor's mean (or arbitrary point on the plane), but only secondary sensor data.

For data samples that include the primary sensor's data, the system may use Equation 10b in the form of Equation 11, particularly as shown in Equation 12, to organize the sample data:

$$T_1 \cdot n_0 + T_2 \cdot 0 + T_3 \cdot 0 = m_0 \cdot n_0 - m_1 \cdot n_0 \qquad (12)$$

Conversely, for those samples in which the primary sensor's data is not present (e.g., where only data for secondary Sensors 1 and 2 are available), the system may take advantage of the equalities of the translations to write the sample data as shown in Equation 13:

$$T_1 \cdot 0 + T_2 \cdot n_0 + T_3 \cdot -n_0 = m_3 \cdot n_0 - m_2 \cdot n_0 \qquad (13)$$

again, analogous to the situation described above for Equation 8.

Inter-Sensor Calibration—Generalized Example Translation Determination Pseudocode FIG. 13 is an example of a generalized pseudocode listing for an example translation transform determination as may be implemented in some embodiments. At line 1 the system may receive all the sample sets, though in many embodiments, these operations will simply be a continuation of the listing in FIG. 10 and it will be unnecessary to again acquire the sample sets from calibration. Similarly, the system may prepare the matrix or other structure for holding the linear equations at line 2. At line 3 the system may generate or acquire the previously determined rotation transforms associated with each camera. At lines 4 and 5, the system may determine the points on the calibration plane (e.g., the means as discussed herein) and initialize the data structure that will hold the solved translation vectors associated with each camera.

At lines 7-30, the system may then iterate through the sample sets. At lines 9-12 the system may rotate the position of the means in accordance with the rotation transforms. At line 14 the system may determine the normal for use in the linear equations of this sample set (e.g., $n_0$ in Equations 12 and 13). In some embodiments, this may simply be the normal of the primary camera's data if the primary camera is present in the sample, or if the primary camera is not present, the rotated normal of a secondary sensor. Some embodiments may average or consolidate normals across cameras in the dataset to better identify the normal to use in the linear equations (e.g., to average out errors). Thus, the system may average the normal of the primary sensor with the rotated normals of one or more of the secondary sensors. In some embodiments, corrections made in one sample set may be carried forward in subsequent sample sets (e.g., to account for a persistent offset error).

Once the normals and rotated means are available, the system may iterate through the relevant cameras, ignoring those without samples in the sample set at lines 18 and 22. Where data is available the system may generate new rows representing linear equations in the matrix M using the corresponding means and normal vector. Particularly, where one of the cameras is the primary camera, Equation 12 may be used (line 25) and where both cameras are secondary cameras Equation 13 may be used (line 27). Again, though these examples use only two cameras one will appreciate variations wherein more than two cameras may be considered in a single equation. Also, though the system considers the primary camera first at line 16 and only succeeding secondary cameras at line 20, one will appreciate possible implementations where this isn't necessarily the case.

Once the matrix M has been populated with the equations, they may be solved for the translation transforms at line 31 using any of the many well-known computational methods (matrix decomposition, Givens rotations, etc.). The system may then assign the appropriate translation to the corresponding camera at lines 32-33.

Inter-Sensor Calibration—Example Data Structure for Translation Determinations

While one will recognize many different ways to implement the embodiments disclosed herein, to facilitate understanding, this section describes an example data structure that may be used in some embodiments. FIG. 14 is a graphical depiction of a matrix object abiding by the form of Equations 12 and 13 that may be generated and used in some embodiments. Particularly, this matrix again considers the four sensor example discussed above (a primary sensor Sensor 0, and secondary sensors Sensor 1, Sensor 2, Sensor 3). The upper index again indicates the sample set number, while the lower index indicates the dimension and sensor. For example, $n_{y2}^4$ indicates the "y component" associated with "Sensor 2" captured during the "fourth sample set". The columns identified in the region 1405 comprise the right side of the form in Equation 11, while the remaining columns comprise the left side. Note that while this example provides a separate index for the normal as perceived at each sensor (i.e., $n_{y1}^1$ when a normal is available for Sensor 1 in the first sample set, $n_{x3}^5$ when a normal is available for Sensor 3 in the fifth sample set, etc.) to facilitate understanding, post-rotation, these normals should generally be equivalent, or the same, as discussed above. Accordingly, only the consolidated normal $n_0$ appears in the region 1405. In some embodiments, the matrix would be populated with only the consolidated normal's values.

Thus, Rows 1-3 correspond to samples wherein the sample includes means data for the primary Sensor 0 and a secondary sensor. These rows accordingly correspond to the form of Equation 12. Similarly, Rows 4-6 indicate samples containing only data for secondary sensors. These rows accordingly correspond to the form of Equation 13. In this matrix, since the normals are already known, there are only 3*3=9 unknowns (three sensors, with a three-dimensional translation vector associated with each) and consequently only 9 equations to solve. As mentioned above, however, if the system considers natural movement of the user holding the calibration object, there may be thousands of samples—many more than are necessary to solve for the unknown variables.

Inter-Sensor Calibration—Consideration of Three or More Samples in a Set

While the above rotation and translation examples considered sample sets having simultaneous depth captures of the calibration object from only two cameras, one would appreciate that the disclosed approach may be readily extended to situations where depth values from more than two cameras was acquired in the sample set. For example, with regard to rotations, for a sample set with data from only two cameras, the only new row would originate from Equation 5. However, if data for three cameras (e.g., Sensors 0, 1 and 2) was present in the sample set, then there are three possible data pairs and three new corresponding equations that may be inserted into the matrix of linear equations, e.g.:

$$R_1 \cdot n_1 + R_2 \cdot 0 + R_3 \cdot 0 = n_0 \qquad (14)$$

$$R_1 \cdot 0 + R_2 \cdot n_2 + R_3 \cdot 0 = n_0 \qquad (15)$$

$$R_1 \cdot n_1 + R_2 \cdot n_2 + R_3 \cdot 0 = 0 \qquad (16)$$

Similarly, if data for four cameras appear in the sample set (e.g., Sensors 0, 1, 2 and 3), then there are six possible data pairs and six new corresponding equations, e.g.:

$$R_1 \cdot n_1 + R_2 \cdot 0 + R_3 \cdot 0 = n_0 \qquad (17)$$

$$R_1 \cdot 0 + R_2 \cdot n_2 + R_3 \cdot 0 = n_0 \qquad (18)$$

$$R_1 \cdot 0 + R_2 \cdot 0 + R_3 \cdot n_3 = n_0 \qquad (19)$$

$$R_1 \cdot n_1 + R_2 \cdot n_2 + R_3 \cdot 0 = 0 \quad (20)$$

$$R_1 \cdot n_1 + R_2 \cdot 0 + R_3 \cdot n_3 = 0 \quad (21)$$

$$R_1 \cdot 0 + R_2 \cdot n_2 + R_3 \cdot n_3 = 0 \quad (22)$$

The same reasoning can be readily applied to the translation set of linear equations. Similarly, in some embodiments, many more cameras than four may simultaneously provide depth data in a sample set.

Floor Estimation—Example Use Case

Various of the disclosed embodiments may incorporate one or more features disclosed in U.S. patent application Ser. No. 15/018,048 filed on Feb. 8, 2016 (incorporated by reference herein in its entirety). For example, proper detection of user gestures post-calibration may benefit from an accurate characterization of the floor plane. Data from several post-calibrated sensors may be used together to estimate a floor plane. Conversely, accurate characterization of the floor plane using one or more sensors before calibration, may then be used to help identify the calibration plane in some embodiments.

Figure 15:
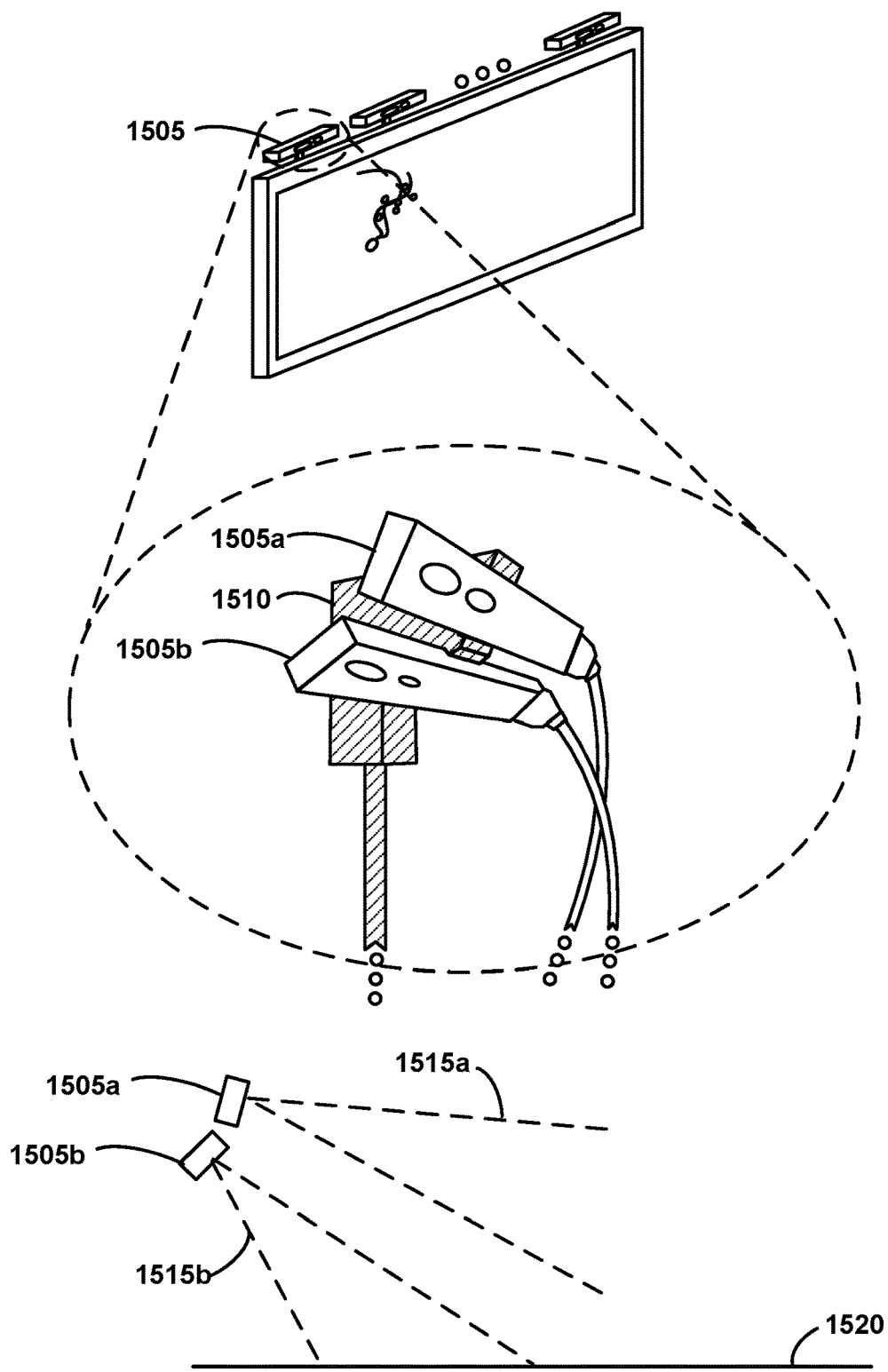
FIG. 15 is a of perspective of a multi-angled sensor platform as may be implemented in some embodiments.

The floor plane may not always be visible to the sensors, as when the sensors are placed at oblique angles relative to the floor, the floor is at an unusual or sloping position, the floor moves, etc. For example, FIG. 15 is a perspective view of an example multi-angled sensor platform as may be implemented in some embodiments. The sensor mount 1505 may actually comprise two separate depth sensors 1505a and 1505b attached via a bracket 1510 at relative angles. While mechanically coupled, the system may treat the two separate depth sensors 1505a and 1505b as separate sensors during calibration (e.g., sensor 1505a may be the primary sensor for all sensors on the structure and sensor 1505b another secondary sensor). These angles may be such that one sensor 1505b has a field of view 1515b encompassing the floor 1520, while sensor 1505a's field of view 1515a does not include the floor 1520. In some embodiments, the system may determine the floor for those sensors that are unable to view the floor, from the data from the sensors that are able to view the floor. In some circumstances (e.g., exotic sensor orientations, situations where no sensor views the floor, moving floors/elevators, etc.) this may not be possible. Accordingly, various embodiments consider applying floor estimation methods described below to estimate the floor plane, before, during, or after the calibration methods presented above.

FIG. 16 is a series of perspective 1600a and side 1600b views of example depth data 1605 as may be acquired in some embodiments. In this example, a user is pointing at a depth sensor with his right hand while standing in front of a wall. A table to his left has also be captured in the field of view. Thus, depth values associated with the user 1610 include a portion associated with the user's head 1610a and a portion associated with the user's extended right arm 1610b. Similarly, the background behind the user is reflected in the depth values 1620, including those values 1615 associated with the table.

To facilitate understanding, the side view 1600b also includes a depiction of the depth sensor's field of view 1635 at the time of the frame capture. The depth sensor's angle 1630 at the origin is such that the user's upper torso, but not the user's legs have been captured in the frame.

Though FIG. 16 depicts the depth data as a "point cloud", one will readily recognize that the data received from a depth sensor may appear in many different forms. For example, a depth sensor, such as depth sensor 1505a or 1505b, may include a grid-like array of detectors. These detectors may acquire an image of the scene from the perspective of fields of depth captures 1515a or 1515b respectively. For example, some depth detectors include an "emitter" producing electromagnetic radiation. The travel time from the emitter to an object in the scene, to one of the grid cell detectors may correspond to the depth value associated with that grid cell. The depth determinations at each of these detectors may be output as a two-dimensional grid of depth values. A "depth frame" as used herein generally refers to such a two-dimensional grid, but can also refer to the more general representations of the three-dimensional depth data acquired from the depth sensor.

Example Depth Data Clipping Methodology

Figure 17:
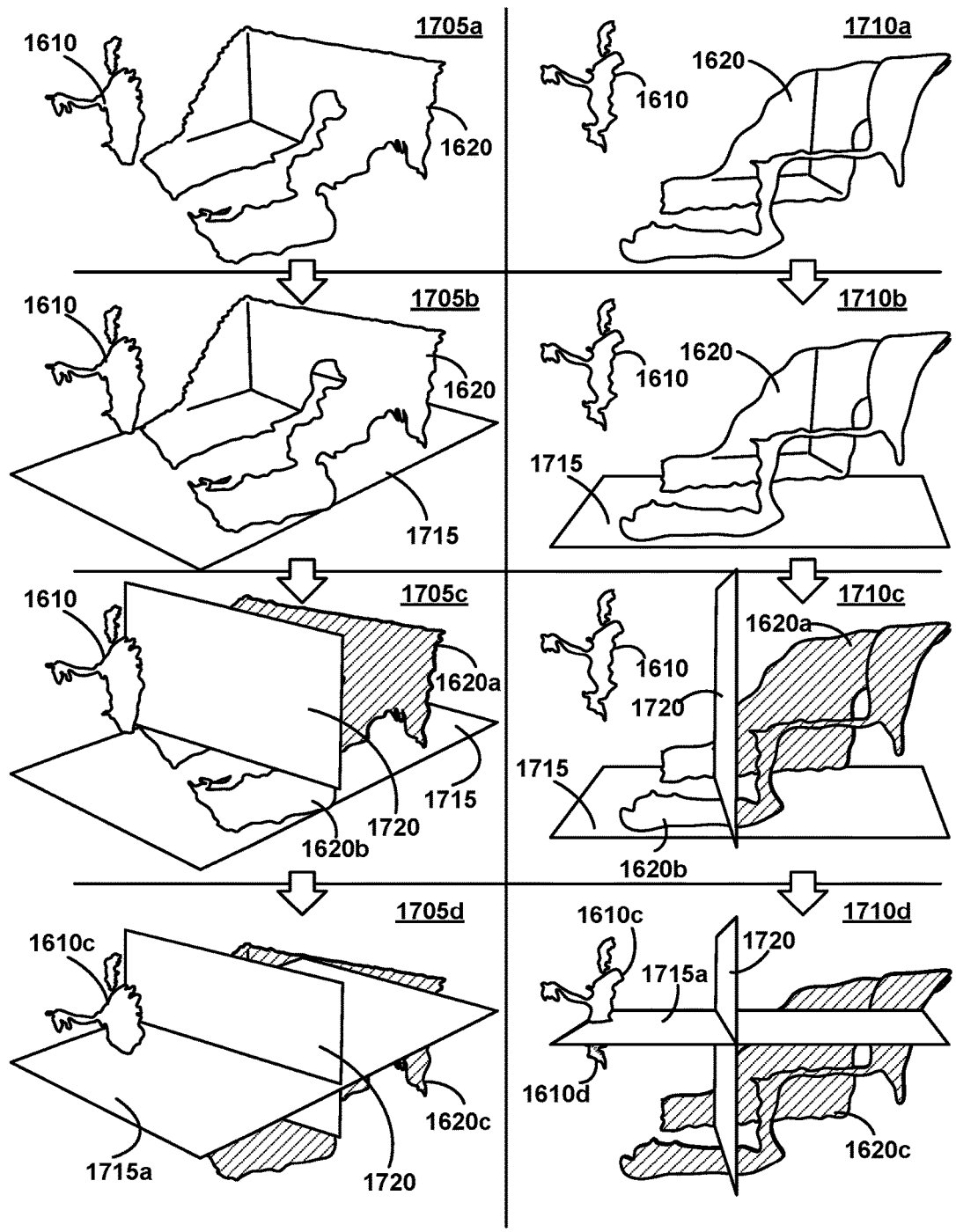
FIG. 17 is a series of views illustrating data isolation via plane clipping as may be applied to the depth data of FIG. 16 in some embodiments.

Many applications would like to infer the user's gestures from the depth data 1605. Accomplishing this from the raw depth data could be quite challenging and so some embodiments apply preprocessing procedures to isolate the depth values of interest. For example, FIG. 17 is a series of views illustrating data isolation via plane clipping as may be applied to the depth data 1605 of FIG. 16 in some embodiments. Particularly, perspective view 1705a and side view 1710a illustrate the depth data 1605 (including portions associated with the user 1610 and portions associated with the background 1620). Perspective view 1705b and side view 1710b show the depth data 1605 relative to a floor plane 1715. The floor plane 1715 is not part of the depth frame data 1605 (though it may be in other examples). Rather, the floor plane 1715 may be assumed based upon context or estimated by the processing system.

Perspective view 1705c and side view 1710c introduce a wall plane 1720, which may also be assumed or estimated by the processing system. The floor and wall plane may be used as "clipping planes" to exclude depth data from subsequent processing. For example, based upon the assumed context in which the depth sensor is used, a processing system may place the wall plane 1720 halfway to the maximum range of the depth sensor's field of view. Depth data values behind this plane may be excluded from subsequent processing. For example, the portion 1620a of the background depth data may be excluded, but the portion 1620b may be retained as shown in perspective view 1705c and side view 1710c.

Ideally, the portion 1620b of the background would also be excluded from subsequent processing, since it does not encompass data related to the user. Some embodiments further exclude depth data by "raising" the floor plane 1715 based upon context to a position 1715a as shown in perspective view 1705d and side view 1710d. This may result in the exclusion of the portion 1620b from future processing. These clipping operations may also remove portions of the user data 1610d which will not contain gestures (e.g., the lower torso). Thus, only the portion 1610c remains for further processing. One will recognize that FIG. 17 simply depicts one possible clipping process for a given context. Different contexts, for example, situations where gestures include the user's lower torso, may be addressed in a similar fashion. Many such operations will still require an accurate assessment of the floor 1715 and wall 1720 planes to perform accurate clipping.

Example Depth Data Classification Methodology

Following the isolation of the depth values which may contain gesture data of interest, the processing system may classify the depth values into various user portions. These portions, or "classes", may reflect particular parts of the user's body and can be used to infer gestures. FIG. 18 is an example component classification as may be applied to the isolated data of FIG. 17 in some embodiments. Initially 1800a, the extracted data 1610c may be unclassified. Following classification 1800*b*, each of the depth values may be associated with a given classification. The granularity of the classification may reflect the character of the gestures of interest. For example, some applications may be interested in the direction the user is looking, and so may break the head into a "head" class 1815 and a "nose" class 1820. Based upon the relative orientation of the "head" class 1815 and the "nose" class 1820 the system can infer the direction in which the user's head is turned. Since the chest and torso are not generally relevant to the gestures of interest in this example, only broad classifications "upper torso" 1825 and "lower torso" 1835 are used. Similarly, the details of the upper arm are not as relevant as other portions and so a single class "right arm" 1830*c* and a single class "left arm" 1830*b* may be used.

In contrast, the lower arm and hand may be very relevant to gesture determination and more granular classifications may be used. For example, a "right lower arm" class 1840, a "right wrist" class 1845, a "right hand" class 1855, a "right thumb" class 1850, and a "right fingers" class 1860 may be used. Though not shown, complementary classes for the left lower arm may also be used. With these granular classifications, the system may able to infer, e.g., a direction the user is pointing, by comparing the relative orientation of the classified depth points.

Example Depth Data Processing Pipeline

Figure 19:
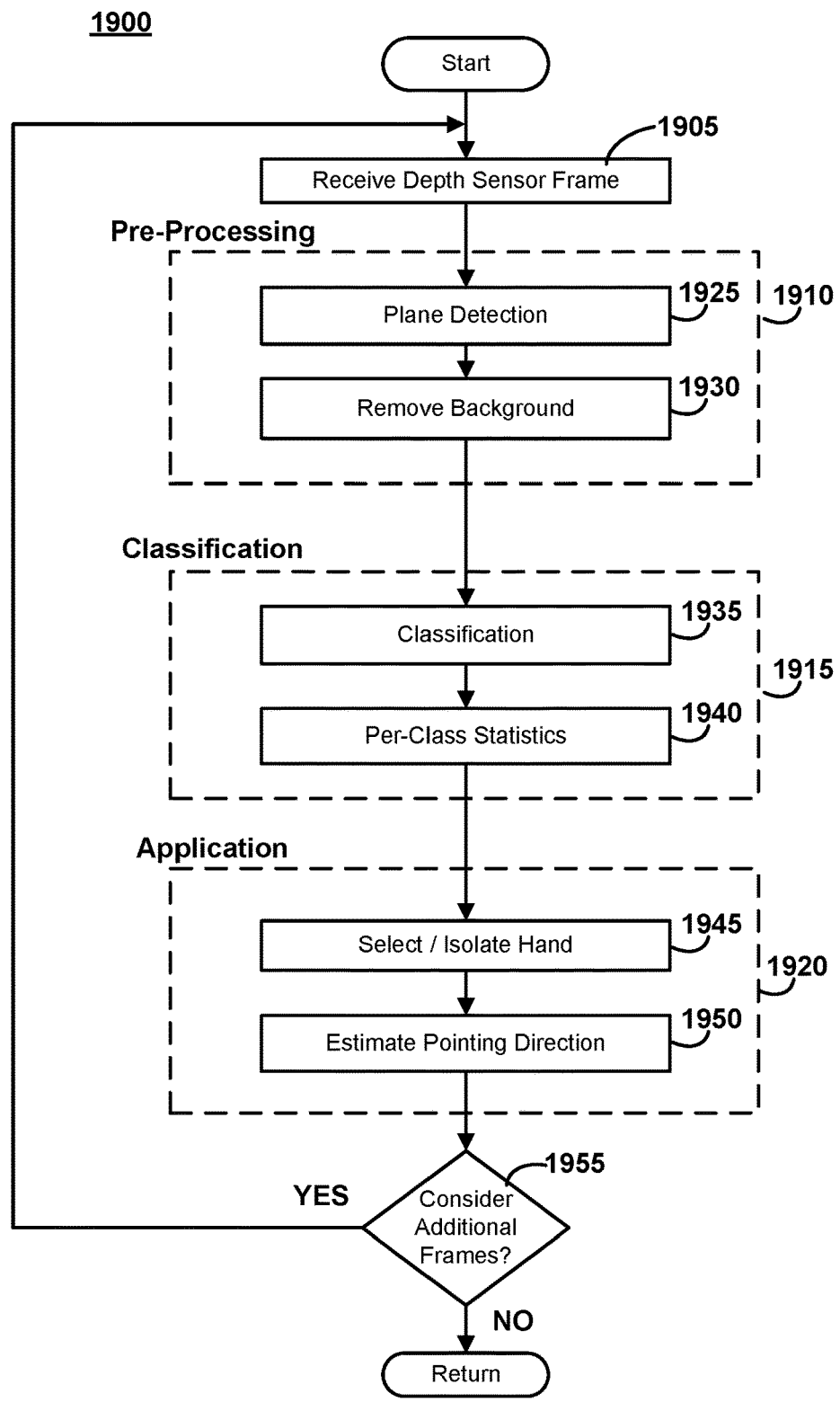
FIG. 19 is a flow diagram illustrating some example depth data processing operations as may be performed in some embodiments.

FIG. 19 is a flow diagram illustrating some example depth data processing operations 1900 as may be performed in some embodiments. At block 1905, the processing system may receive a frame of depth sensor data (e.g., a frame such as frame 1605). Generally speaking, the data may then pass through "Pre-Processing" 1910, "Classification" 1915, and "Application" 1920 stages. During "Pre-Processing" 1910, the processing system may perform "plane detection" at block 1925 using the frame data or based upon assumptions or depth camera configuration details. This may include, e.g., the clipping planes discussed with respect to FIG. 17, such as the floor 1715 plane and wall plane 1720. These planes may be used, e.g., to isolate the depth values of interest at block 1930, e.g., as described above with respect to FIG. 17.

During Classification 1915, the system may associate groups of depth values with a particular class at block 1935. For example, the system may determine a classification using classes as discussed with respect to FIG. 18. At block 1940, the system may determine per-class statistics (e.g., the number of depth values associated with each class, the effect upon ongoing system training and calibration, etc.). Example classes may include: Nose, Left Index Finger, Left Other Fingers, Left Palm, Left Wrist, Right Index Finger, Right Other Fingers, Right Palm, Right Wrist, and Other.

During the Application 1920 operations, the system may use the class determinations to infer user-behavior relevant to a particular application objective. For example, an HCI interface may seek to determine where the user is presently pointing their hand. In this example, at block 1945, the system will select/isolate the depth values classified as being associated with the "hand" and/or "fingers". From these depth values (and possibly depth values associated with the user's arm) the system may estimate the direction in which the user is pointing in this particular frame at block 1950 (one will recognize that other gestures than this pointing example may also be performed). This data may then be published to an application program, e.g., a kiosk operating system, a game console operating system, etc. At block 1955, the operations may be performed again for additional frames received.

Figure 20:
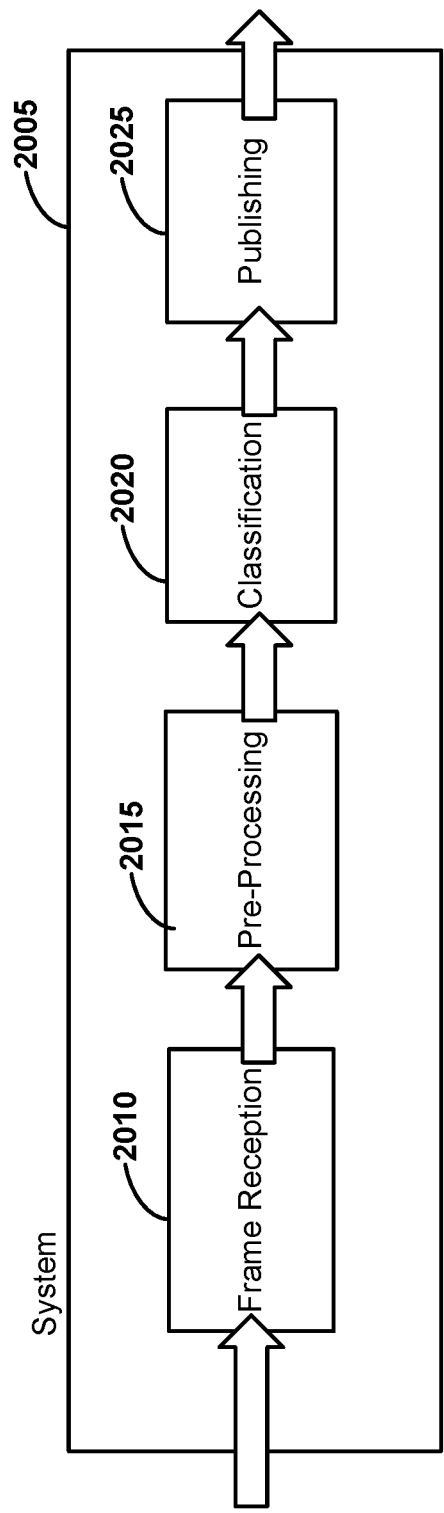
FIG. 20 is a hardware block diagram illustrating an example hardware implementation which may be used to perform depth data processing operations in some embodiments.

FIG. 20 is a hardware block diagram illustrating an example hardware implementation 2005 which may be used to perform depth data processing operations in some embodiments. A frame reception system 2010 may receive a depth frame from a depth sensor. The frame reception system 2010 may be firmware, software, or hardware (e.g., an FPGA implementation, system-on-a-chip, etc.). The frame may be directly passed, or cached and subsequently passed, to a pre-processing module 2015. Pre-processing module 2015 may also be firmware, software, or hardware (e.g., an FPGA implementation, system-on-a-chip, etc.). The pre-processing module may perform the Preprocessing operations 1910 discussed in FIG. 19. The pre-processing results (e.g., the isolated depth values 1610*c*) may then be provided to the Classification module 2020. The Classification module 2020 may be firmware, software, or hardware (e.g., an FPGA implementation, system-on-a-chip, etc.). The Classification module 2020 may perform the Classification operations 1915 discussed in FIG. 19. The classified depth values may then be provided to a Publishing module 2025. The Publishing module 2025 may be configured to package the classification results into a form suitable for a variety of different applications (e.g., as specified at 1920). For example, an interface specification may be provided for kiosk operating systems, gaming operating systems, etc. to receive the classified depth values and to infer various gestures therefrom. The Publishing module 2025 may also be firmware, software, or hardware (e.g., an FPGA implementation, system-on-a-chip, etc.).

Floor Estimation

Figure 21:
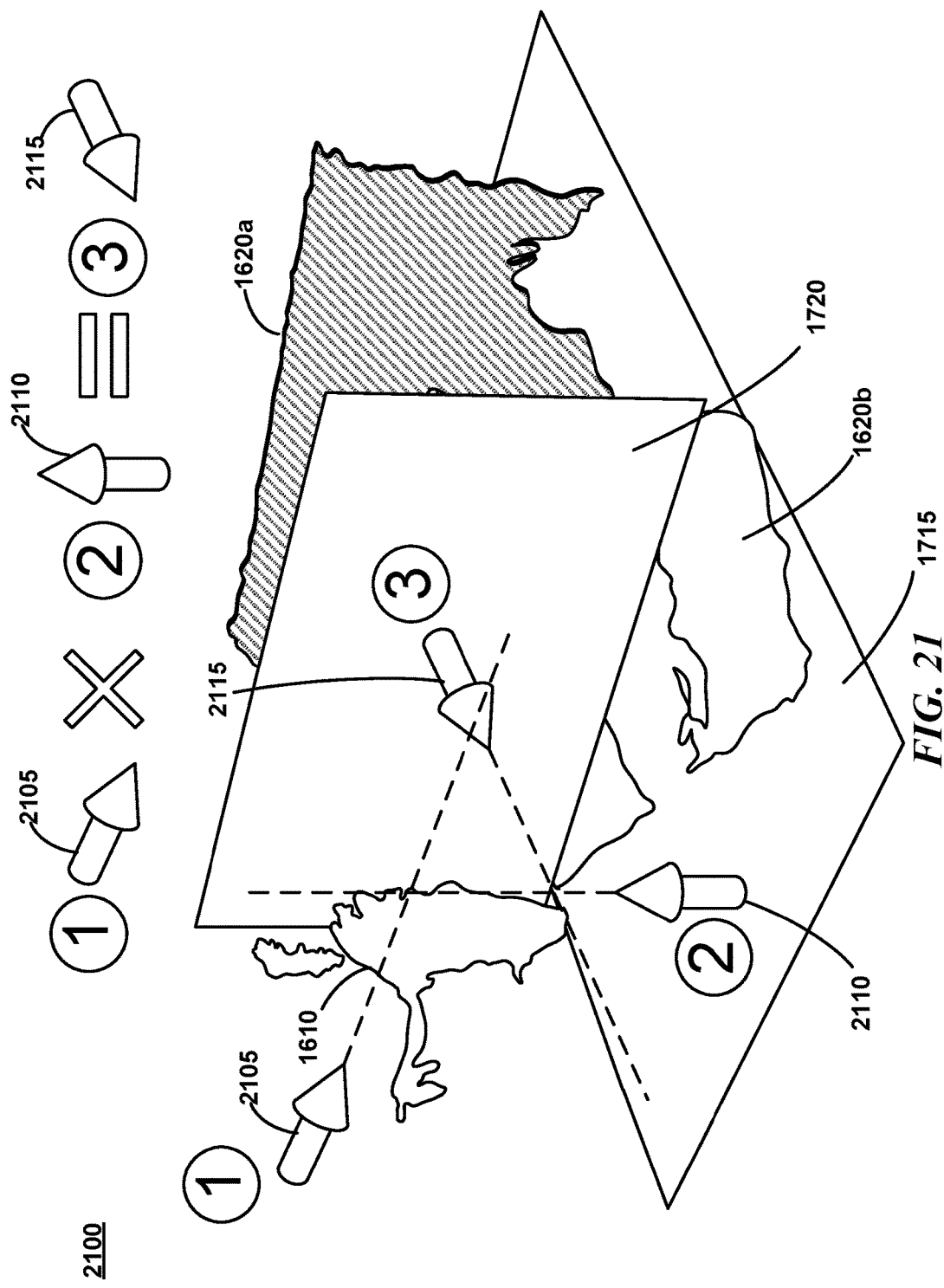
FIG. 21 is a perspective view of a wall normal determination process as may occur in some embodiments.

In some embodiments, determination of the floor plane 1715 may affect the accuracy of the determination of other parameters, e.g., the wall plane 1720. For example, FIG. 21 is a perspective view of a wall normal determination process 2100 as may occur in some embodiments. Particularly, some embodiments may determine normal vector 2115 associated with the wall plane 1720 from the normal vector 2110 associated with the floor plane 1715 and the "X-axis" vector 2105 inferred from the orientation of the depth camera. "X-axis" vector 2105 may be assumed in some situations by the system, rather than inferred from the depth data. The system may determine the normal vector 2115 associated with the wall plane 1720 as the cross product of the "X-axis" vector 2105 with the normal vector 2110 associated with the floor plane 1715 (this particular cross product is merely an example and one will recognize that any suitable combination may be used to infer a vector orthogonal to the plane formed by normal vectors 2105 and 2110). Thus, errors in the determination of the floor 1715 and normal 2110 may propagate into the determination of the wall plane 1720. When the wall plane 1720 and floor plane 1715 are used as clipping planes (e.g., as described in FIG. 17) these errors may result in the undesirable inclusion or removal of portions of the depth data.

Figure 22:
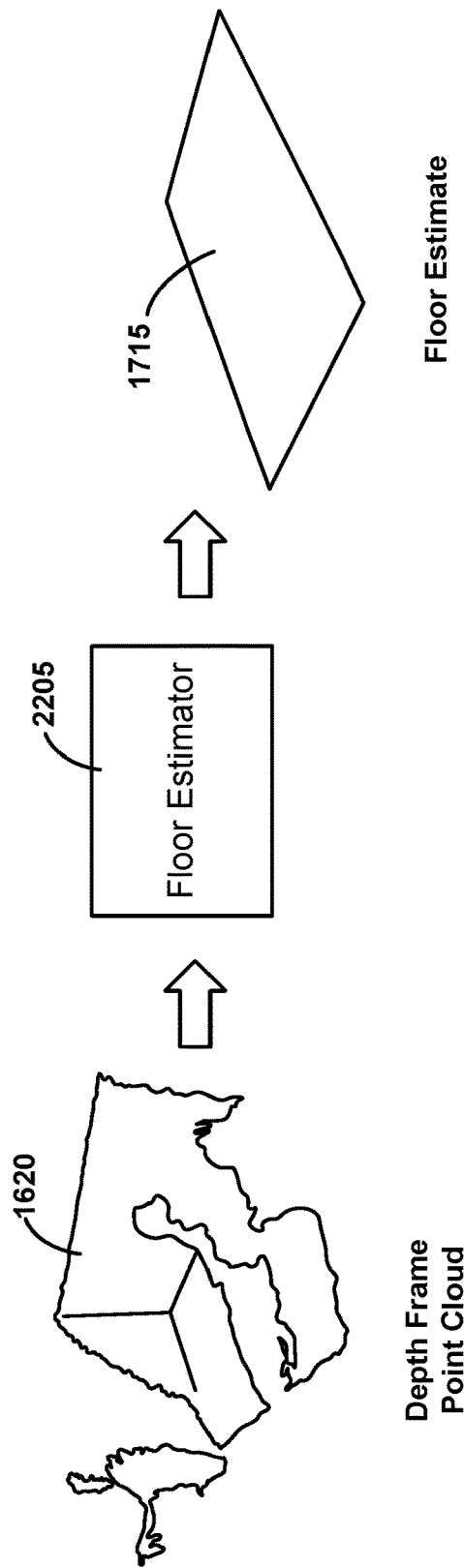
FIG. 22 is a block diagram illustrating operations in a floor estimation process as may occur in some embodiments.

To avoid such problems, some embodiments consider employing a floor estimation procedure to better determine floor plane 1715. FIG. 22 is a block diagram illustrating operations in a floor estimation process as may occur in some embodiments. At a high level, a floor estimator 2205 may determine a floor plane estimate 1715 after receiving a frame of depth data 1620.

Floor Estimation—Metric

Figure 23:
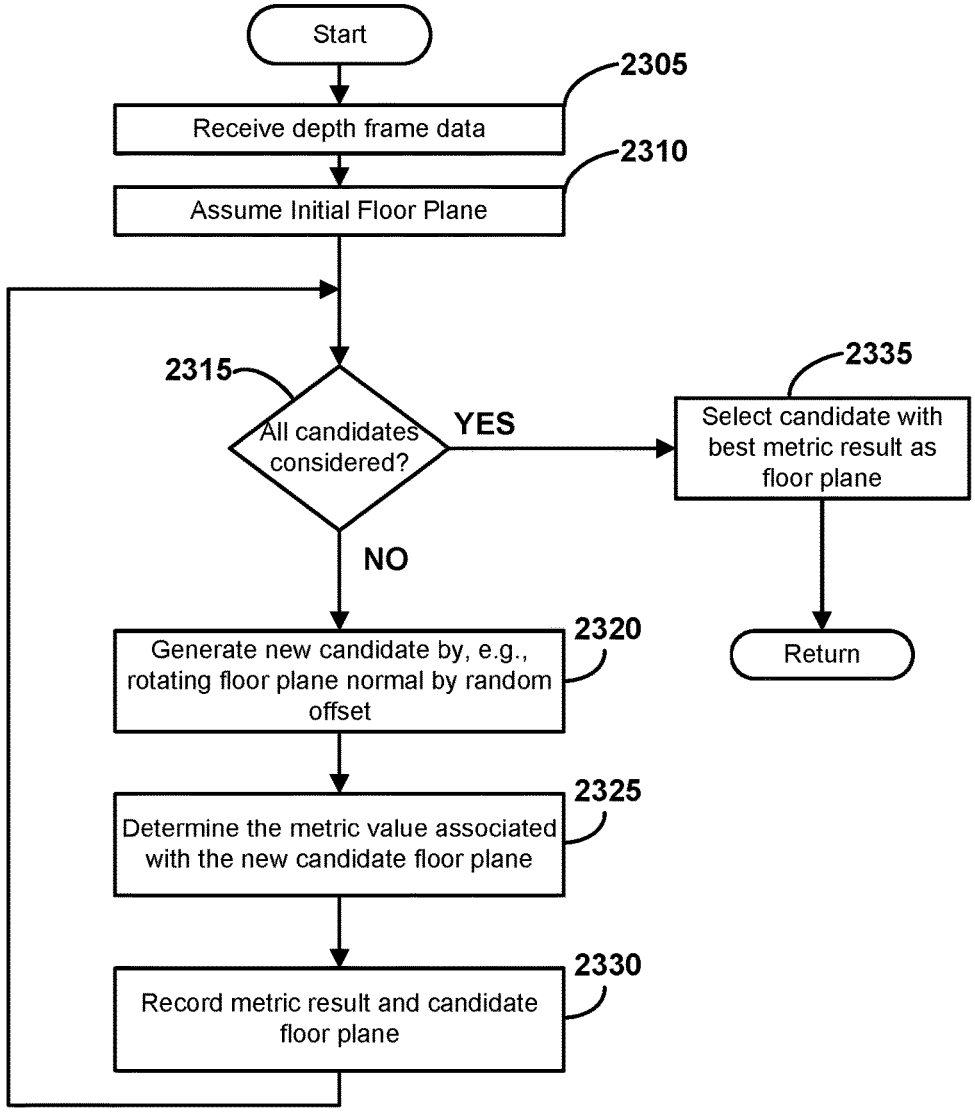
FIG. 23 is a flow diagram illustrating operations in a floor estimation process using a metric as may occur in some embodiments.

FIG. 23 is a flow diagram illustrating operations in a floor estimation process 2300 using a metric as may occur in some embodiments. Such a process may occur, e.g., as part of plane detection at block 1925. At block 2305, the system may receive a frame of depth data (e.g., the frame acquired at block 1905). At block 2310, the system may make an initial estimate of the floor plane (e.g., based upon previous determinations, assumptions regarding the user environment, inertial measurement data, etc.). The system may iteratively perform blocks 2320, 2325, and 2330, until a desired number of floor candidates have been considered at block 2315.

At block 2320, the system may generate a new floor plane candidate, e.g., by rotating the normal associated with the initial floor plane determined at block 2310. The rotation may include components about each of the three possible dimension axes. At block 2325, a metric may be applied to this floor candidate and at block 2330, the results of the metric stored for comparison. One will recognize variations, e.g., where the metric is only retained against a best metric so far determined, the process stops once a metric better than a threshold is determined, etc. Successive candidates may have their respective metrics determined in this manner until a best candidate is selected at block 2335.

Figure 24:
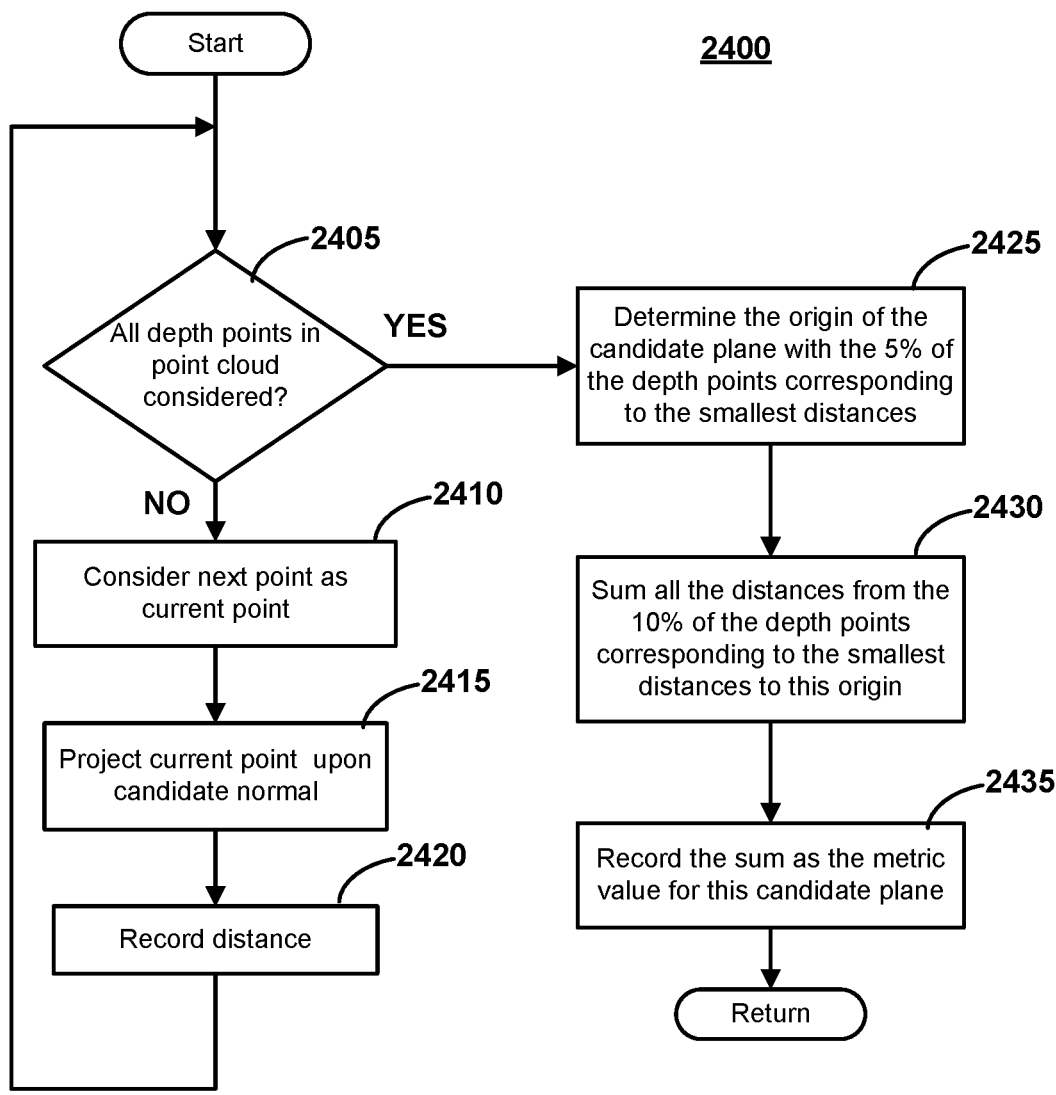
FIG. 24 is a flow diagram illustrating operations in a metric determination process as may occur in some embodiments.

FIG. 24 is a flow diagram illustrating operations in a metric determination process 2400 as may occur in some embodiments. For example, process 2400 may occur at block 2325. The process 2400 may iterate over blocks 2410, 2415, and 2420 until all the depth values in the point cloud have been considered at block 2405. At block 2410 the system may select the next depth point from the point cloud that has not yet been considered as part of this metric determination. At block 2415, the system may determine the projection of the depth point upon the candidate floor plane. The system may record the distance between the projected position and the depth point at block 2420.

When all the points in the depth cloud (or a desired subset) have been considered at block 2405, the system may then determine the origin of the candidate plane from the 5% of the depth frame points associated with the best metric values (e.g., the lowest distances). For example, the origin on the candidate plane may be the projection of the mean of these 5% of the depth values upon the candidate floor plane. Though 5% is used here for illustration purposes, as well as for the results achieved with its use, one will recognize alternative thresholds that may be used in some contexts.

At block 2430, the depth values associated with the top 10% of the metric results may then be considered (again one will recognize that suitable values other than 10% may be used in some embodiments). The system may determine the distance from each of these depth points to the origin determined at block 2425 and sum the result. That sum may then be used as the metric value for the floor candidate at block 2435 (e.g., this may be the metric recorded at block 2330).

Figure 25:
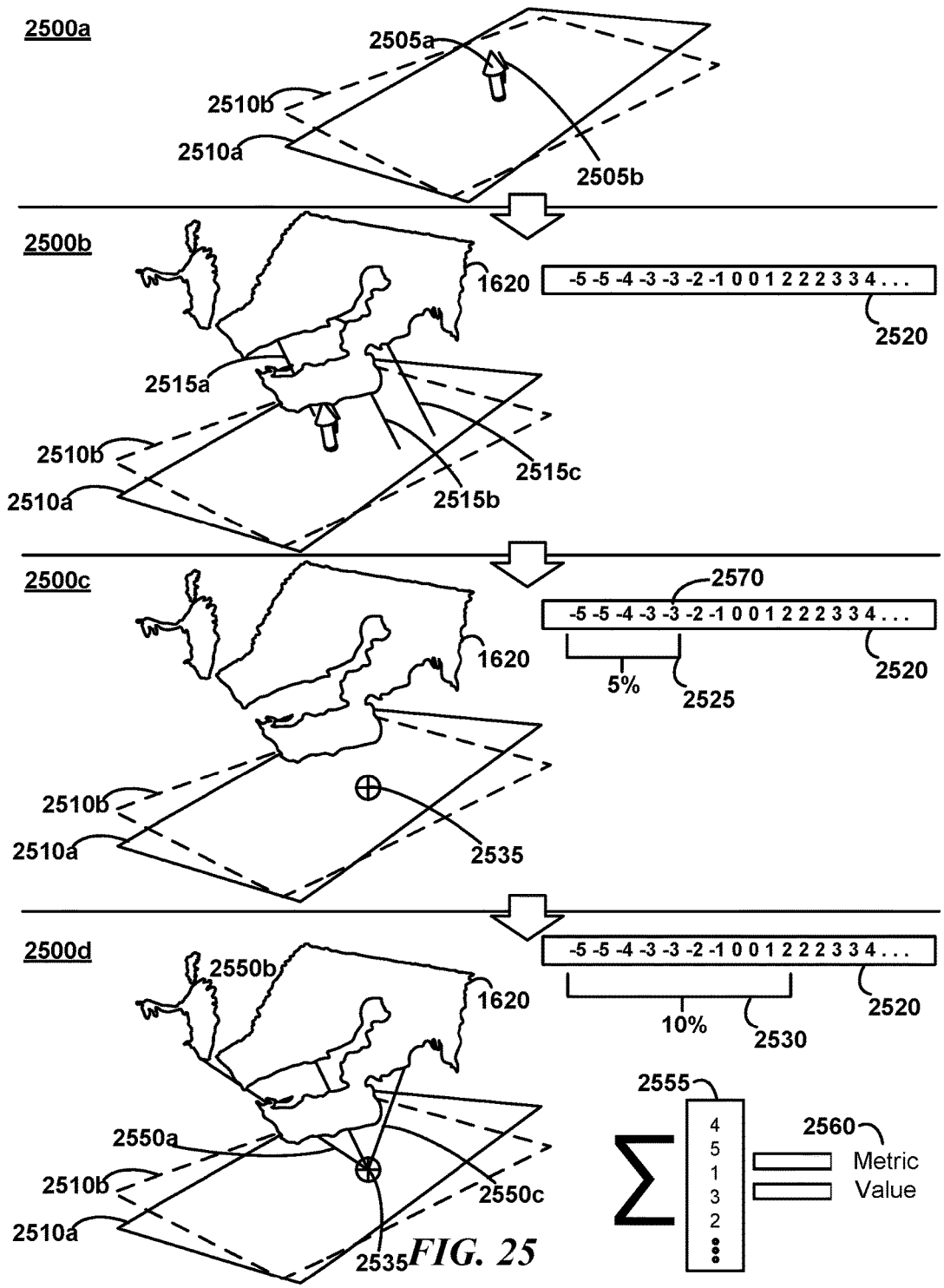
FIG. 25 is a series of views illustrating an example floor metric determination process as may occur in some embodiments.

To facilitate understanding, FIG. 25 is a series of informal views illustrating an example floor metric determination process as may occur in some embodiments. The steps in FIG. 25 may roughly correspond to operations described with respect to FIGS. 23 and 24.

At step 2500a, the system may apply a rotation perturbation to the normal 2505b of a reference floor plane 2510b to produce a new normal 2505a and corresponding candidate floor plane 2510a. The reference floor plane 2510b may be the initially determined floor plane or the current best floor plane estimate. For example, the reference floor plane 2510b may be the initial floor plane in the first iteration and the current best floor plane estimate in the subsequent iterations. This may correspond to the operations at block 2320. At step 2500b, the system may begin iterating over the depth points in the frame 1620 and determine the distance from each depth point (e.g., distances 2515a, 2515b, and 2515c) to the candidate floor plane 2500a. These may be the shortest distance from the points to the plane (their projected point upon the plane). These distances may be recorded in a list 2520 (though one will recognize alternative structures or processes for achieving the same effect). Note that depth points below the candidate floor plane may receive "negative" distances as indicated in the list.

At step 2500c, 5% of the depth points which are associated with the smallest of the distances 2525 may be used to determine an origin 2535 in the candidate floor plane 2500a. The origin 2535 for the new candidate floor plane may be determined, e.g., as the depth point at the 5% boundary of the depth points (e.g., the point associated with depth value 2570). While one will recognize alternative methods for determining plane origin 2535 (e.g., averaging a range of values about the 5% boundary and projecting the result) selecting the boundary depth value in this manner may have advantages in some contexts. For example, if the depth frame data includes outliers due, e.g., to noisy data (such as negative distance numbers that are unreasonably large), that noise may present a significant adverse influence on the data. Using the boundary value 2570 as the origin 2535 may eliminate the effects of such problematic data. Although "smallest" in this examples considers negative values less than positive, in some embodiments only the absolute magnitude of the distances is considered (consequently, depth points lying on the candidate plane will typically be included among the 5%). To clarify, if there were 100 depth value points, then 5 points (i.e., 5% of 100) associated with the lowest distances will be selected and used to determine origin 2535.

Some embodiments may assess the "quality" of the 5% collection of points before using that range, and perhaps its boundary value, for the floor origin. For example, if there is substantial "spread" or variance within the points of the 5% collection, this may indicate that this subset of points contains more than just floor values. Consequently, this 5% may be determined to be a poor choice for the threshold. Upon making such a determination, the system may use a larger threshold (e.g., 10%) or may forego a floor determination with this frame, relying upon a previous floor determination or an interpolation of multiple such previous determinations.

At step 2500d, the system may then determine a greater percentage (e.g., the 10% 2530) of the depth points having the lowest distances 2520 determined at step 2500b. The distances 2555 from each of the depth points in this 10% to the origin 2535 (e.g., distances 2550a-c) may then be summed and the result used as the metric value (though a sum is used, one will recognize that multiplying, or otherwise accumulating the distance values may also suffice). Here, the absolute values of the distances 2550a-c may be used for the sum (e.g., the absolute distance to the floor plane), rather than the potentially negative values below the plane appearing in collection 2520. Alternative embodiments may use the variance of the distances associated with these 10% of the points as the metric value.

Computer System

Figure 26:
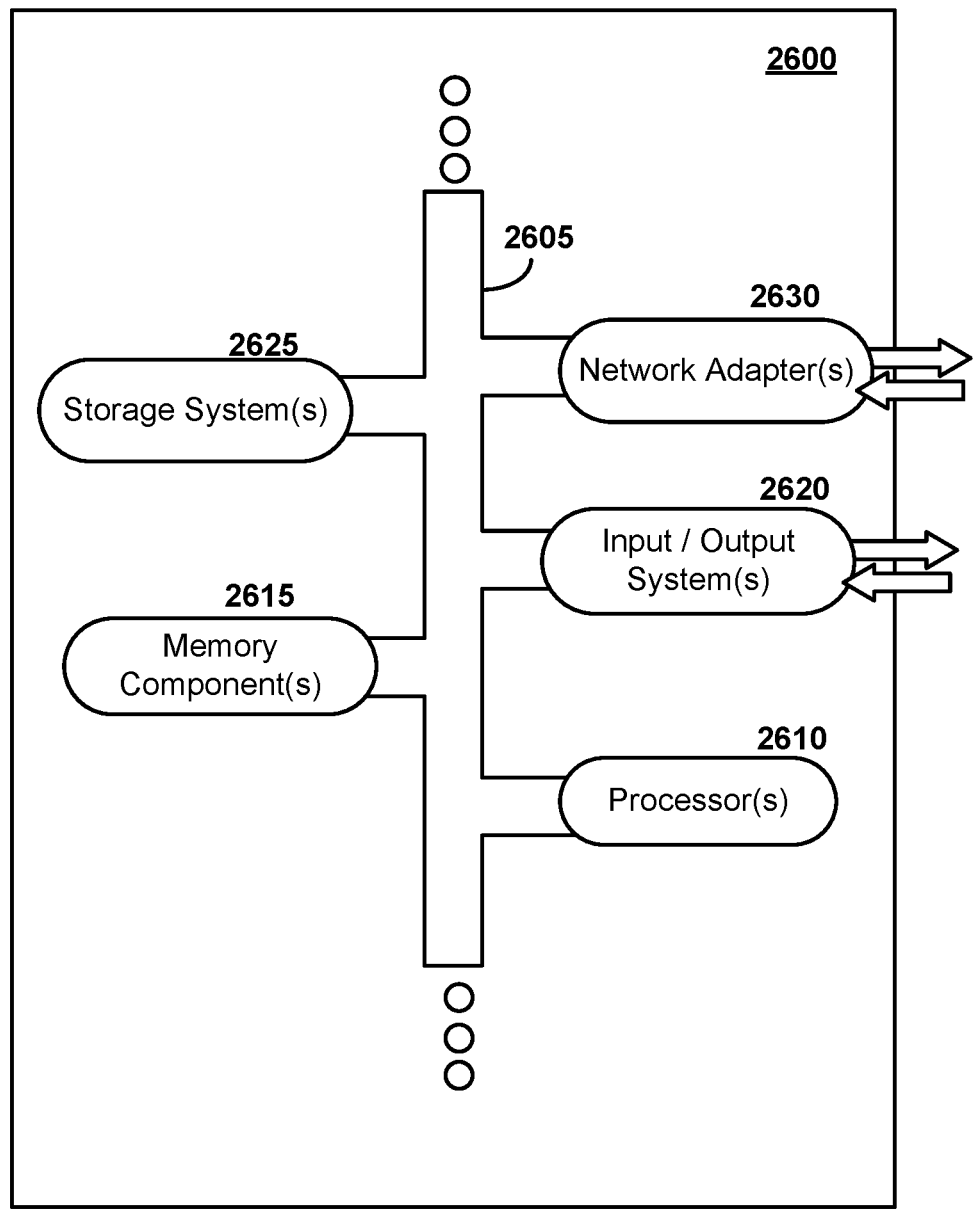
FIG. 26 is a block diagram of an example computer system as may be used in conjunction with some of the embodiments.

FIG. 26 is a block diagram of an example computer system as may be used in conjunction with some of the embodiments. The computing system 2600 may include an interconnect 2605, connecting several components, such as, e.g., one or more processors 2610, one or more memory components 2615, one or more input/output systems 2620, one or more storage systems 2625, one or more network adaptors 2630, etc. The interconnect 2605 may be, e.g., one or more bridges, traces, busses (e.g., an ISA, SCSI, PCI, I2C, Firewire bus, etc.), wires, adapters, or controllers.

The one or more processors 2610 may include, e.g., an Intel™ processor chip, a math coprocessor, a graphics processor, etc. The one or more memory components 2615 may include, e.g., a volatile memory (RAM, SRAM, DRAM, etc.), a non-volatile memory (EPROM, ROM, Flash memory, etc.), or similar devices. The one or more input/output devices 2620 may include, e.g., display devices, keyboards, pointing devices, touchscreen devices, etc. The one or more storage devices 2625 may include, e.g., cloud based storages, removable USB storage, disk drives, etc. In some systems memory components 2615 and storage devices 2625 may be the same components. Network adapters 2630 may include, e.g., wired network interfaces, wireless interfaces, Bluetooth adapters, line-of-sight interfaces, etc.

One will recognize that only some of the components, alternative components, or additional components than those depicted in FIG. 26 may be present in some embodiments. Similarly the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 2630. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 2615 and one or more storage devices 2625 may be computer-readable storage media. In some embodiments, the one or more memory components 2615 or one or more storage devices 2625 may store instructions, which may perform or cause to be performed various of the operations discussed herein. In some embodiments, the instructions stored in memory 2615 can be implemented as software and/or firmware. These instructions may be used to perform operations on the one or more processors 2610 to carry out processes described herein. In some embodiments, such instructions may be provided to the one or more processors 2610 by downloading the instructions from another system, e.g., via network adapter 2630.

Remarks

The above description and drawings are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner; may contain more or less information than shown; may be compressed and/or encrypted; etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference in this specification to "one embodiment" or "an embodiment" means that a particular feature, structure, or characteristic described in connection with the embodiment is included in at least one embodiment of the disclosure. Consequently, the phrase "in one embodiment" in various places in the specification is not necessarily referring to the same embodiment in each of those various places. Separate or alternative embodiments may not be mutually exclusive of other embodiments. One will recognize that various modifications may be made without deviating from the scope of the embodiments.

I claim:

1. A display structure for gesture interactions comprising:
a display screen;
a plurality of sensors, at least two of the plurality of sensors configured to acquire depth information and at least two of the plurality of sensors configured to acquire pixel image information in a region before the display screen;
a computer system configured to perform a method comprising:
capturing a first pixel image at a primary sensor of at least a portion of the primary sensor's field of view;
capturing a second pixel image at a first secondary sensor of at least a portion of the first secondary sensor's field of view;
causing the display screen to display the first pixel image;
causing the display screen to display the second pixel image;
capturing a first set of depth values associated with a calibration object at the primary sensor when the calibration object is in both the primary sensor's field of view and the first secondary sensor's field of view;
capturing a second set of depth values associated with the calibration object at the first secondary sensor when the calibration object is in both the primary sensor's field of view and the first secondary sensor's field of view;
determining a first normal associated with a plane of the calibration object for the first set of depth values;
determining a first on-plane point associated with the plane of the calibration object for the first set of depth values;

determining a second normal associated with the plane of the calibration object for the second set of depth values;

determining a second on-plane point associated with the plane of the calibration object for the second set of depth values;

generating a first system of linear equations, in part, using a linear equation derived from the first normal and the second normal;

solving for components of a rotation transform using the first system of linear equations;

generating a second system of linear equations, in part, using a linear equation derived from the first on-plane point and the second on-plane point; and solving for components of a translation transform using the second system of linear equations, wherein the rotation transform and translation transform move a point from the perspective of the first secondary sensor to the perspective of the primary sensor.

2. The display structure of claim 1, wherein the first on-plane point is an average of the depth values associated with the plane visible to the primary sensor.

3. The display structure of claim 1, wherein the calibration object is a planar board.

4. The display structure of claim 1, wherein the primary sensor's field of view and the first secondary sensor's field of view do not overlap.

5. The display structure of claim 1, the method further comprising:

capturing a third set of depth values associated with the calibration object at a second secondary sensor when the calibration object is in both the second secondary sensor's field of view and the first secondary sensor's field of view, but not within the primary sensor's field of view;

capturing a fourth set of depth values associated with the calibration object at the first secondary sensor when the calibration object is in both the second secondary sensor's field of view and the first secondary sensor's field of view, but not within the primary sensor's field of view;

determining a third normal associated with a plane of the calibration object for the third set of depth values;

determining a third on-plane point associated with the plane of the calibration object for the third set of depth values;

determining a fourth normal associated with a plane of the calibration object for the fourth set of depth values; and determining a fourth on-plane point associated with the plane of the calibration object for the fourth set of depth values, wherein generating the first system of linear equations further comprises inserting a linear equation derived from the third normal and the fourth normal, and wherein generating the second system of linear equations further comprises inserting a linear equation derived from the third on-plane point and the fourth on-plane point.

6. The display structure of claim 5, wherein at least two of the plurality of sensors are vertically offset relative to one another by a bracket.

7. A computer-implemented method for calibrating a plurality of sensors, comprising:

capturing a first pixel image at a primary sensor of at least a portion of the primary sensor's field of view;

capturing a second pixel image at a first secondary sensor of at least a portion of the first secondary sensor's field of view;

causing a first display screen to display the first pixel image;

causing a second display screen to display the second pixel image;

capturing a first set of depth values associated with a calibration object at the primary sensor when the calibration object is in both the primary sensor's field of view and the first secondary sensor's field of view;

capturing a second set of depth values associated with the calibration object at the first secondary sensor when the calibration object is in both the primary sensor's field of view and the first secondary sensor's field of view;

determining a first normal associated with a plane of the calibration object for the first set of depth values;

determining a first on-plane point associated with the plane of the calibration object for the first set of depth values;

determining a second normal associated with the plane of the calibration object for the second set of depth values;

determining a second on-plane point associated with the plane of the calibration object for the second set of depth values;

generating a first system of linear equations, in part, using a linear equation derived from the first normal and the second normal;

solving for components of a rotation transform using the first system of linear equations;

generating a second system of linear equations, in part, using a linear equation derived from the first on-plane point and the second on-plane point; and solving for components of a translation transform using the second system of linear equations, wherein the rotation transform and translation transform move a point from the perspective of the first secondary sensor to the perspective of the primary sensor.

8. The computer-implemented method of claim 7, wherein the first display and the second display are the same display.

9. The computer-implemented method of claim 7, wherein the first on-plane point is an average of the depth values associated with the plane visible to the primary sensor.

10. The computer-implemented method of claim 7, wherein the calibration object is a planar board.

11. The computer-implemented method of claim 7, wherein the primary sensor's field of view and the first secondary sensor's field of view do not overlap.

12. The computer-implemented method of claim 7, the method further comprising:

capturing a third set of depth values associated with the calibration object at a second secondary sensor when the calibration object is in both the second secondary sensor's field of view and the first secondary sensor's field of view, but not within the primary sensor's field of view;

capturing a fourth set of depth values associated with the calibration object at the first secondary sensor when the calibration object is in both the second secondary sensor's field of view and the first secondary sensor's field of view, but not within the primary sensor's field of view;

determining a third normal associated with a plane of the calibration object for the third set of depth values;

determining a third on-plane point associated with the plane of the calibration object for the third set of depth values;

determining a fourth normal associated with a plane of the calibration object for the fourth set of depth values; and determining a fourth on-plane point associated with the plane of the calibration object for the fourth set of depth values, wherein generating the first system of linear equations further comprises inserting a linear equation derived from the third normal and the fourth normal, and wherein generating the second system of linear equations further comprises inserting a linear equation derived from the third on-plane point and the fourth on-plane point.

13. The computer-implemented method of claim 12, wherein at least two of the plurality of sensors are vertically offset relative to one another by a bracket.

14. A non-transitory computer-readable medium comprising instructions configured to cause a computer system to perform a method comprising:

capturing a first set of depth values associated with a calibration object at a primary sensor when the calibration object is in both the primary sensor's field of view and a first secondary sensor's field of view;

capturing a second set of depth values associated with the calibration object at the first secondary sensor when the calibration object is in both the primary sensor's field of view and the first secondary sensor's field of view;

determining a first normal associated with a plane of the calibration object for the first set of depth values;

determining a first on-plane point associated with the plane of the calibration object for the first set of depth values;

determining a second normal associated with the plane of the calibration object for the second set of depth values;

determining a second on-plane point associated with the plane of the calibration object for the second set of depth values;

generating a first system of linear equations, in part, using a linear equation derived from the first normal and the second normal;

solving for components of a rotation transform using the first system of linear equations;

generating a second system of linear equations, in part, using a linear equation derived from the first on-plane point and the second on-plane point; and solving for components of a translation transform using the second system of linear equations, wherein the rotation transform and translation transform move a point from the perspective of the first secondary sensor to the perspective of the primary sensor.

15. The non-transitory computer-readable medium of claim 14, wherein the first on-plane point is an average of the depth values associated with the plane visible to the primary sensor.

16. The non-transitory computer-readable medium of claim 14, wherein the calibration object is a planar board.

17. The non-transitory computer-readable medium of claim 14, wherein the primary sensor's field of view and the first secondary sensor's field of view do not overlap.

18. The non-transitory computer-readable medium of claim 14, the method further comprising:

capturing a third set of depth values associated with the calibration object at a second secondary sensor when the calibration object is in both the second secondary sensor's field of view and the first secondary sensor's field of view, but not within the primary sensor's field of view;

capturing a fourth set of depth values associated with the calibration object at the first secondary sensor when the calibration object is in both the second secondary sensor's field of view and the first secondary sensor's field of view, but not within the primary sensor's field of view;

determining a third normal associated with a plane of the calibration object for the third set of depth values;

determining a third on-plane point associated with the plane of the calibration object for the third set of depth values;

determining a fourth normal associated with a plane of the calibration object for the fourth set of depth values; and determining a fourth on-plane point associated with the plane of the calibration object for the fourth set of depth values, wherein generating the first system of linear equations further comprises inserting a linear equation derived from the third normal and the fourth normal, and wherein generating the second system of linear equations further comprises inserting a linear equation derived from the third on-plane point and the fourth on-plane point.

19. The non-transitory computer-readable medium of claim 18, wherein at least two of the plurality of sensors are vertically offset relative to one another by a bracket.

20. The display structure of claim 1, wherein the display screen comprises multiple screens.

* * * * *